US012573426B2

(12) United States Patent
Maeto

(10) Patent No.: US 12,573,426 B2
(45) Date of Patent: *\*Mar. 10, 2026

(54) MAGNETIC DISK APPARATUS AND METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/939,917

(22) Filed: Nov. 7, 2024

(65) Prior Publication Data

US 2025/0095684 A1      Mar. 20, 2025

Related U.S. Application Data

(63) Continuation of application No. 18/390,530, filed on Dec. 20, 2023, now Pat. No. 12,176,002.

(30) Foreign Application Priority Data

Sep. 19, 2023      (JP) ................................. 2023-151554

(51) Int. Cl.
*G11B 20/18* (2006.01)
*G11B 20/12* (2006.01)
(52) U.S. Cl.
CPC .. *G11B 20/1217* (2013.01); *G11B 2020/1232* (2013.01)

(58) Field of Classification Search
CPC ..... G11B 20/1252; G11B 5/09; G11B 5/5548; G11B 5/56; G11B 5/59694; G11B 20/20; G11B 5/54; G11B 5/00834; G11B 5/55; G11B 20/00572; G11B 5/5965; G11B 5/59688; G11B 5/012; G11B 5/59627; G11B 27/36; G11B 20/10305; G11B 20/10314; G11B 2220/2516; G11B 20/10388; G11B 5/5543; G11B 20/1816; G11B 20/12; G11B 20/18
USPC .......................................................... 360/48
See application file for complete search history.

(56) References Cited

U.S. PATENT DOCUMENTS

| | | | |
|---|---|---|---|
| 10,650,860 B2 | 5/2020 | Maeto et al. | |
| 10,748,567 B1 | 8/2020 | Zaitsu et al. | |
| 10,910,013 B1 | 2/2021 | Kawabe et al. | |
| 11,152,029 B2 | 10/2021 | Nakamura | |
| 12,020,733 B2 * | 6/2024 | Ravindran | ........... G11B 5/5573 |

* cited by examiner

*Primary Examiner* — Nabil Z Hindi
(74) *Attorney, Agent, or Firm* — Kim & Stewart LLP

(57) ABSTRACT

According to an embodiment, tracks on a magnetic disk each include a long-distance sector having a length in the circumferential direction covering two or more servo sectors. A controller executes an acquisition operation to acquire one or more evaluation amounts on the basis of a track pitch in each of the two or more servo sectors included in a portion adjacent to the long-distance sector. The controller executes a protection operation to protect data of an adjacent track in a case where a total value of the one or more evaluation amounts exceeds a first threshold value.

10 Claims, 20 Drawing Sheets

| POSITION OF MAGNETIC HEAD | DS#n | DS#(n+1) | DS#(n+2) | DS#(n+3) | SQsum1 | SQsum2 |
|---|---|---|---|---|---|---|
| SV#p | 0 nm (50 nm) | 0 nm | 0 nm | 0 nm | 0 nm | 0 nm |
| SV#(p+1) | 6 nm (50 nm) | 6 nm (44 nm) | 6 nm | 6 nm | 24 nm | 12 nm |
| SV#(p+2) | 6 nm (50 nm) | 7 nm (44 nm) | 7 nm (43 nm) | 7 nm | 28 nm | 20 nm |
| SV#(p+3) | 6 nm (50 nm) | 7 nm (44 nm) | 7 nm (43 nm) | 2 nm (48 nm) | 24 nm | 24 nm |

TPset: 50 nm
Th1: 24 nm
Cov: 2 nm

SECTOR SLIPPING

DS#n        DS#(n+1)        DS#(n+2)                        DS#(n+3)

OUTER SIDE

RADIAL DIRECTION

WHw

TRACK #1

TRACK #2

TRACK #3

TRACK #4

TRACK #5

INNER SIDE

MAGNETIC DISK APPARATUS AND METHOD

CROSS-REFERENCE TO RELATED APPLICATIONS

This application is a continuation of U.S. patent application Ser. No. 18/390,530, filed on Dec. 20, 2023, which is based upon and claims the benefit of priority from Japanese Patent Application No. 2023-151554, filed on Sep. 19, 2023; the entire contents of each of which are incorporated herein by reference.

FIELD

Embodiments described herein relate generally to a magnetic disk apparatus and a method.

BACKGROUND

Conventionally, as a method of arranging data on a magnetic disk, a configuration has been known, in which data is written in a region longer than a length corresponding to the size of a unit to be transmitted to and received from a host. Such a region is herein referred to as a long-distance sector. The long-distance sector has a length covering multiple servo sectors in the circumferential direction.

BRIEF DESCRIPTION OF THE DRAWINGS

FIG. 6 is a diagram for explaining an example of a deinterleave operation according to the first embodiment;

FIG. 13 is a table illustrating an example of a squeeze evaluation amount for each data sector calculated in the magnetic disk apparatus according to the first embodiment;

DETAILED DESCRIPTION

According to the present embodiments, a magnetic disk apparatus includes a magnetic disk, a magnetic head, and a controller. On the magnetic disk, multiple tracks are provided. The multiple tracks each include multiple servo sectors in which servo information is recorded. The multiple servo sectors are arranged at intervals in a circumferential direction. The multiple tracks each include multiple long-distance sectors. Each of the multiple long-distance sectors is a region to which data is written. The region has a length in the circumferential direction covering two or more of the multiple servo sectors. The magnetic head executes data writing and data reading to and from each of the multiple long-distance sectors. The controller executes an acquisition operation and a protection operation in a write operation to a first portion of a first track being one of the multiple tracks. The first portion is adjacent to one long-distance sector in a second track adjacent to the first track. The acquisition operation is executed to acquire one or more evaluation amounts corresponding to a squeeze amount of a track pitch based on a set value of the track pitch on the basis of the track pitch in each of two or more first servo sectors. The two or more first servo sectors are two or more servo sectors included in a range between two ends in the circumferential direction of the first portion. The protection operation is executed to protect data of the second track in a case where a first total value exceeds a first threshold value. The first total value is a total value of the one or more evaluation amounts.

Hereinafter, a magnetic disk apparatus and a method according to embodiments will be described in detail with reference to the accompanying drawings. Note that the present invention is not limited by these embodiments.

First Embodiment

Figure 1:
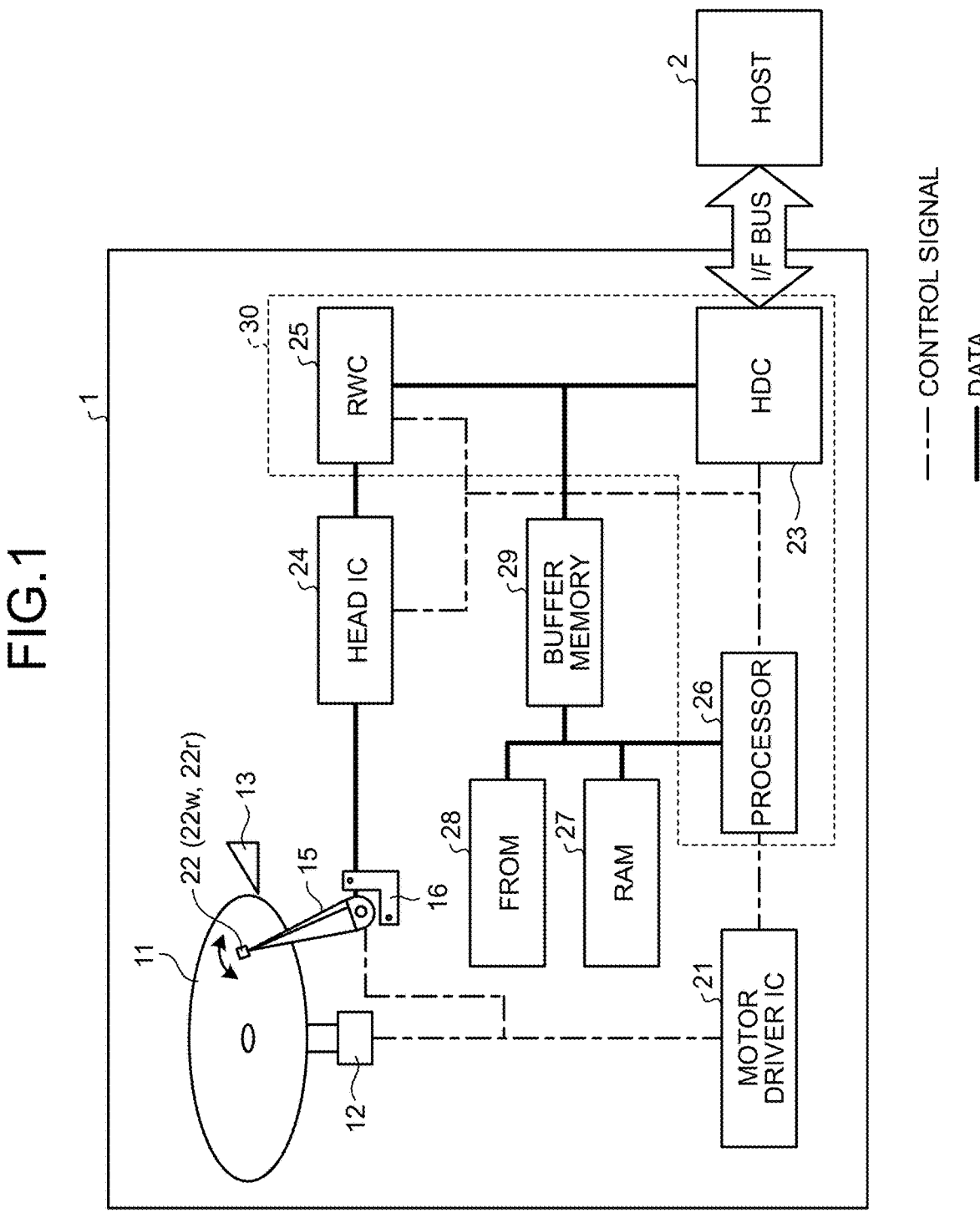
FIG. 1 is a schematic diagram illustrating an example of a configuration of a magnetic disk apparatus according to a first embodiment.

FIG. 1 is a schematic diagram illustrating an example of a configuration of a magnetic disk apparatus 1 according to a first embodiment.

The magnetic disk apparatus 1 is connected to a host 2. The magnetic disk apparatus 1 can receive an access command such as a write command or a read command from the host 2.

The magnetic disk apparatus 1 includes a magnetic disk 11 having a recording surface. The magnetic disk apparatus 1 writes and reads data to and from the magnetic disk 11 (more precisely, the recording surface of the magnetic disk 11) in response to an access command. Note that, although the magnetic disk apparatus 1 can include multiple magnetic disks 11, in the embodiment, the magnetic disk apparatus 1 includes one magnetic disk 11 for the sake of simplicity of description and illustration.

Data is written and read through a magnetic head 22. In addition to the magnetic disk 11, the magnetic disk apparatus 1 includes a spindle motor 12, a motor driver integrated circuit (IC) 21, the magnetic head 22, an actuator arm 15, a voice coil motor (VCM) 16, a ramp 13, a head IC 24, a read and write channel (RWC) 25, a RAM 27, a flash read only memory (FROM) 28, a buffer memory 29, a hard disk controller (HDC) 23, and a processor 26.

The magnetic disk 11 is rotated at a predetermined rotation speed by the spindle motor 12 attached to a rotation shaft of the magnetic disk 11. The spindle motor 12 is driven by the motor driver IC 21.

The motor driver IC 21 controls the rotation of the spindle motor 12 and the rotation of the VCM 16.

The magnetic head 22 writes and reads data to and from the magnetic disk 11 by a write element 22w and a read element 22r included in the magnetic head 22. The magnetic head 22 is attached to a distal end of the actuator arm 15. The magnetic head 22 is moved in the radial direction of the magnetic disk 11 by the VCM 16 driven by the motor driver IC 21.

For example, in cases like when the rotation of the magnetic disk 11 is stopped, the magnetic head 22 is moved to the ramp 13. The ramp 13 holds the magnetic head 22 at a position spaced apart from the magnetic disk 11.

The head IC 24 amplifies and outputs a signal read from the magnetic disk 11 by the magnetic head 22 at the time of reading, and supplies the signal to the RWC 25. In addition, the head IC 24 amplifies a signal corresponding to data to be written that is supplied from the RWC 25, and supplies the amplified signal to the magnetic head 22.

The HDC 23 performs control of transmission and reception of data to and from the host 2 via an I/F bus, control of the buffer memory 29, error correction processing of read data, and others.

The buffer memory 29 is used as a buffer for data transmitted to and received from the host 2. For example, the buffer memory 29 is used for temporarily storing data to be written to the magnetic disk 11 or data read from the magnetic disk 11.

The buffer memory 29 includes, for example, a volatile memory capable of high-speed operations. The type of the memory included in the buffer memory 29 is not limited to a specific type. The buffer memory 29 can be implemented by, for example, a dynamic random access memory (DRAM), a static random access memory (SRAM), or a combination of them.

The RWC 25 modulates data to be written that is supplied from the HDC 23 and supplies the modulated data to the head IC 24. Additionally, the RWC 25 demodulates a signal read from the magnetic disk 11 and then supplied from the head IC 24, and outputs the demodulated signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and others. Note that the firmware may be stored in the magnetic disk 11.

The RAM 27 includes, for example, a DRAM, an SRAM, or a combination of them. The RAM 27 is used as an operation memory by the processor 26. The RAM 27 is used as an area in which the firmware is loaded or an area in which various types of management data are held.

The processor 26 performs overall control of the magnetic disk apparatus 1 in accordance with the firmware stored in the FROM 28 or the magnetic disk 11. For example, the processor 26 loads the firmware from the FROM 28 or the magnetic disk 11 to the RAM 27 and executes control of the motor driver IC 21, the head IC 24, the RWC 25, the HDC 23, and others in accordance with the loaded firmware.

Note that a configuration including the RWC 25, the processor 26, and the HDC 23 can be regarded as a controller 30. The controller 30 may be configured as a system-on-a-chip (SoC). The controller 30 is not necessarily configured as the SoC. In addition to these components, the controller 30 may include other components (such as the RAM 27, the FROM 28, the buffer memory 29, or the RWC 25).

Figure 2:
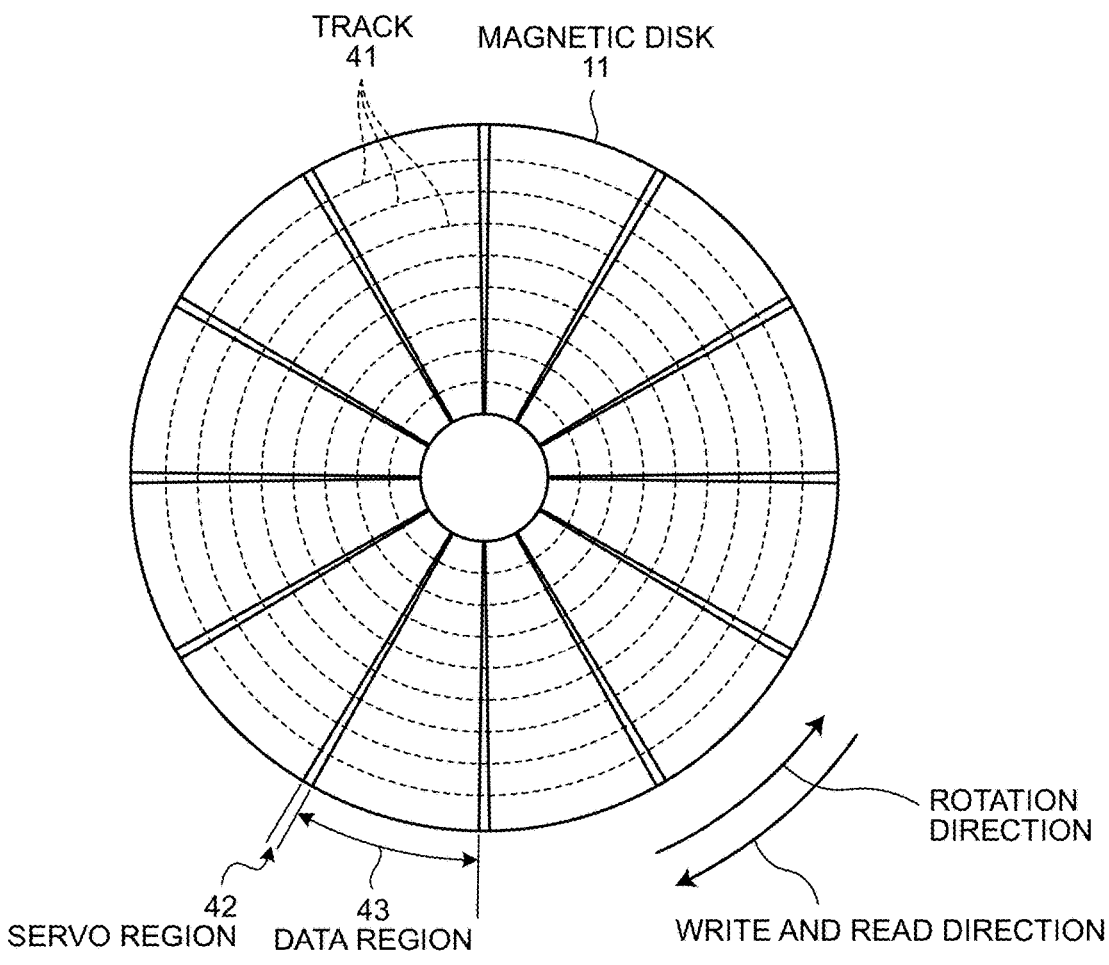
FIG. 2 is a schematic diagram illustrating an example of a configuration of a magnetic disk according to the first embodiment.

FIG. 2 is a schematic diagram illustrating an example of the configuration of the magnetic disk 11 according to the first embodiment. Note that illustrated in this drawing is an example of the rotation direction of the magnetic disk 11. The magnetic head 22 moves relative to the magnetic disk 11 by the rotation of the magnetic disk 11. Therefore, a write and read direction, namely, a direction in which data is written or read by the magnetic head 22 in the circumferential direction is opposite to the rotation direction of the magnetic disk 11.

Servo information is written to the magnetic disk 11 by a servo writer or by self-servo write (SSW) in the manufacturing process, for example. Illustrated in FIG. 2 are servo regions 42 radially arranged as an example of arrangement of servo regions in which the servo information is written. Data regions 43 in which data can be written are each provided between the servo regions 42.

Multiple concentric tracks 41 are set in the radial direction of the magnetic disk 11 on the basis of the servo information. In each of the data regions 43 provided along the track 41, multiple data sectors in which data is written are arranged.

Hereinafter, regions of the tracks 41 segmented by the servo regions 42 are referred to as servo sectors SV. It can be perceived that multiple servo sectors SV are arranged on the track 41 at intervals in the circumferential direction.

Here, expressions regarding the positional relationship in the circumferential direction used herein will be defined. In a case where there are a first region and a second region near the first region along the write and read direction, and the magnetic head 22 passes over the first region before passing over the second region, the direction viewed from the second region towards the first region is referred to as "front". In addition, the direction viewed from the first region towards the second region is referred to as "back" or "behind". In addition, in a case where there are a first region and multiple second regions along the write and read direction, a second region closest to the first region before the first region among the multiple second regions may be referred to as an "immediately preceding" second region of the first region. In addition, in a case where there are a first region and multiple second regions along the write and read direction, a second region closest to the first region behind the first region among the multiple second regions may be referred to as an "immediately after" second region of the first region.

As methods for writing data on a magnetic disk, a method called shingled magnetic recording (SMR) and a method called conventional magnetic recording (CMR) have been known. These methods are collectively referred to as recording methods.

In the first embodiment, the controller 30 can write data to the magnetic disk 11 in the SMR method.

Figure 3:
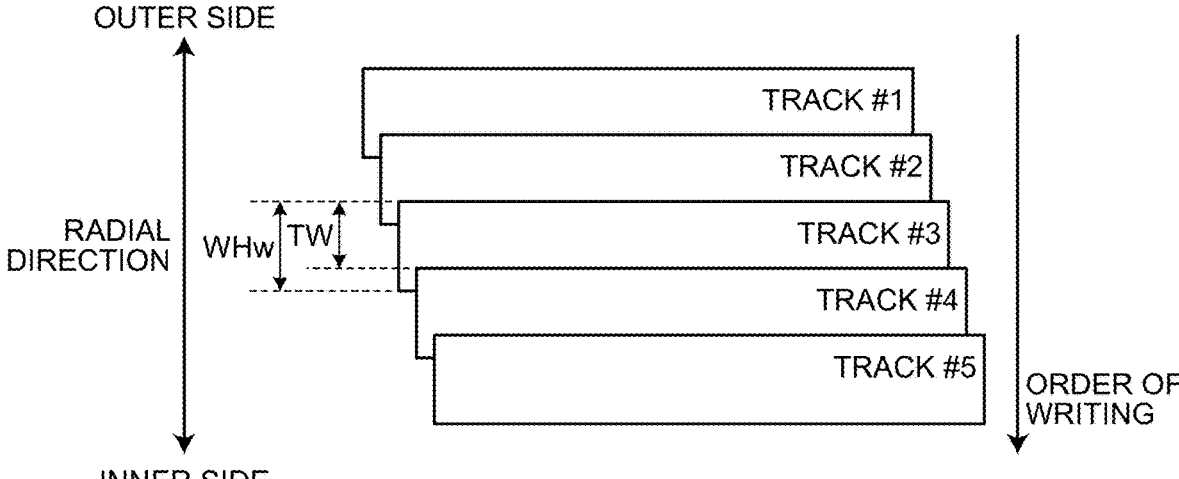
FIG. 3 is a schematic diagram for explaining an SMR method used in the magnetic disk apparatus according to the first embodiment.

FIG. 3 is a schematic diagram for explaining the SMR method used in the magnetic disk apparatus 1 according to the first embodiment. In the SMR method, in a case where writing of data (referred to as first data) to one track 41 is executed, and then writing of data (referred to as second data) to another track 41 radially adjacent to the one track 41 is executed, these tracks 41 are arranged such that the second data overlaps with part of the first data. In other words, according to the SMR method, data of one of two tracks 41 adjacent to each other in the radial direction of the magnetic disk 11 is written so as to partly overlap with data of the other one of the two tracks 41.

For example, data of track #2 is written in such a manner as to overlap with part of data of track #1 that has been already written. Likewise, data of track #3 is written in such a manner as to overlap with part of data of track #2 that has been already written. According to the SMR method, data of one track is partly overlapped with data of an adjacent track that has been already written, and this is repeatedly performed.

As a result, each of the track widths TW is narrowed than the width (WHw) of the write element 22w, and the recording density is enhanced.

However, according to the SMR method, the track width TW is narrower than the width WHw of the write element 22w, so that updating of part of data of multiple tracks results in destroying data of a track adjacent to the updated data. In order to prevent data destruction, data of multiple tracks including the part of data is collectively updated. A region of the multiple tracks that is collectively updated is referred to as a band.

According to the SMR method, it is also specified that writing can be executed on multiple tracks 41 in one band only from a predetermined one of the outer side and the inner side of a magnetic disk towards the other one determined in advance. In the example illustrated in FIG. 3, writing is executed for each track 41 from the outer side towards the inner side. The controller 30 may execute writing for each track 41 from the inner side towards the outer side. In addition, the order of writing may be set independently for each band.

Hereinafter, as an example, description will be given on the premise that writing is performed for each track 41 from the outer side towards the inner side in the SMR method.

In the first embodiment, each track 41 includes multiple long-distance sectors. Each long-distance sector is a region in which data is written. Each long-distance sector has a circumferential length covering two or more servo sectors SV.

Figure 4:
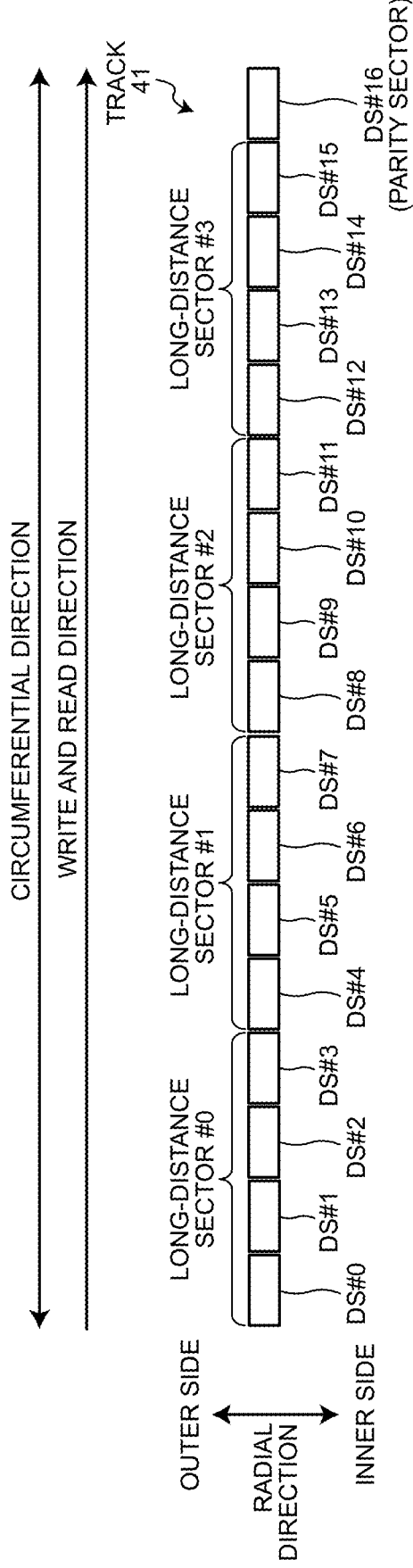
FIG. 4 is a diagram for explaining an example of a configuration of a long-distance sector according to the first embodiment.

FIG. 4 is a diagram for explaining an example of a configuration of a long-distance sector according to the first embodiment. Note that, in this drawing, servo sectors SV are not illustrated.

In one track 41, a large number of data sectors DS are arranged. A data sector ID is given to each of the data sectors DS in the track 41. A data sector DS to which an ID of "X" is given is referred to as a data sector DS #X.

In the example illustrated in FIG. 4, sixteen data sectors DS are arranged in one track 41. Numerical information corresponding to the positional order along the track 41 is given as an ID to each of the sixteen data sectors DS.

Each of the data sectors DS has a capacity corresponding to a unit size of data to be transferred between the host 2 and the magnetic disk apparatus 1.

For example, in a case where the host 2 supports 4K sectors, data is transferred between the host 2 and the magnetic disk apparatus 1 in units of 4K bytes. In such a case, each of the data sectors DS has a capacity corresponding to 4K bytes. More specifically, the controller 30 performs predetermined data processing, such as encoding by an error correction code, on data units of 4 K bytes coming from the host 2 and writes the data units after the predetermined data processing on the magnetic disk 11. By the predetermined data processing, the size of a data unit becomes larger than 4K bytes. Each of the data sectors DS has a capacity that can store a data unit having a size larger than 4K bytes due to the predetermined data processing.

One long-distance sector is constituted by multiple data sectors DS consecutively arranged along the track 41. Similarly to the data sectors DS, numerical information corresponding to the positional order along the track 41 is given as an ID to each long-distance sector.

In the example illustrated in FIG. 4, four data sectors DS constitute one long-distance sector. Specifically, data sectors DS #0 to DS #3 constitute a long-distance sector #0, data sectors DS #4 to DS #7 constitute a long-distance sector #1, data sectors DS #8 to DS #11 constitute a long-distance sector #2, and data sectors DS #12 to DS #15 constitute a long-distance sector #3.

The remaining data sector #16 is set as a sector in which the parity is written, namely, as a parity sector. The parity written in the data sector DS #16 is used for protecting the group of data units written in the data sectors DS #0 to DS #15 from the occurrence of an error. The parity written in the data sector DS #16 protects the data for the entire track 41.

A method of calculating the parity is not limited to a specific method. In one example, the parity is created by executing XOR for each bit position on a group of data units written in the data sectors DS #0 to DS #15. Note that, in a case where an interleave operation described later is executed, the parity is calculated before the interleave operation.

Hereinafter, data to be written in one data sector DS or the data before error correction coding is referred to as a data unit. In addition, a set including four data units to be written in a long-distance sector is referred to as a data unit set. Error correction based on an error correction code executed on a data unit encoded by the error correction code is referred to as first error correction. Error correction performed by using the parity is referred to as second error correction.

Note that the second error correction is executed when the first error correction fails in a read operation.

Moreover, in the first embodiment, the controller 30 is capable of executing an interleave operation and a deinterleave operation on a data unit set.

Figure 5:
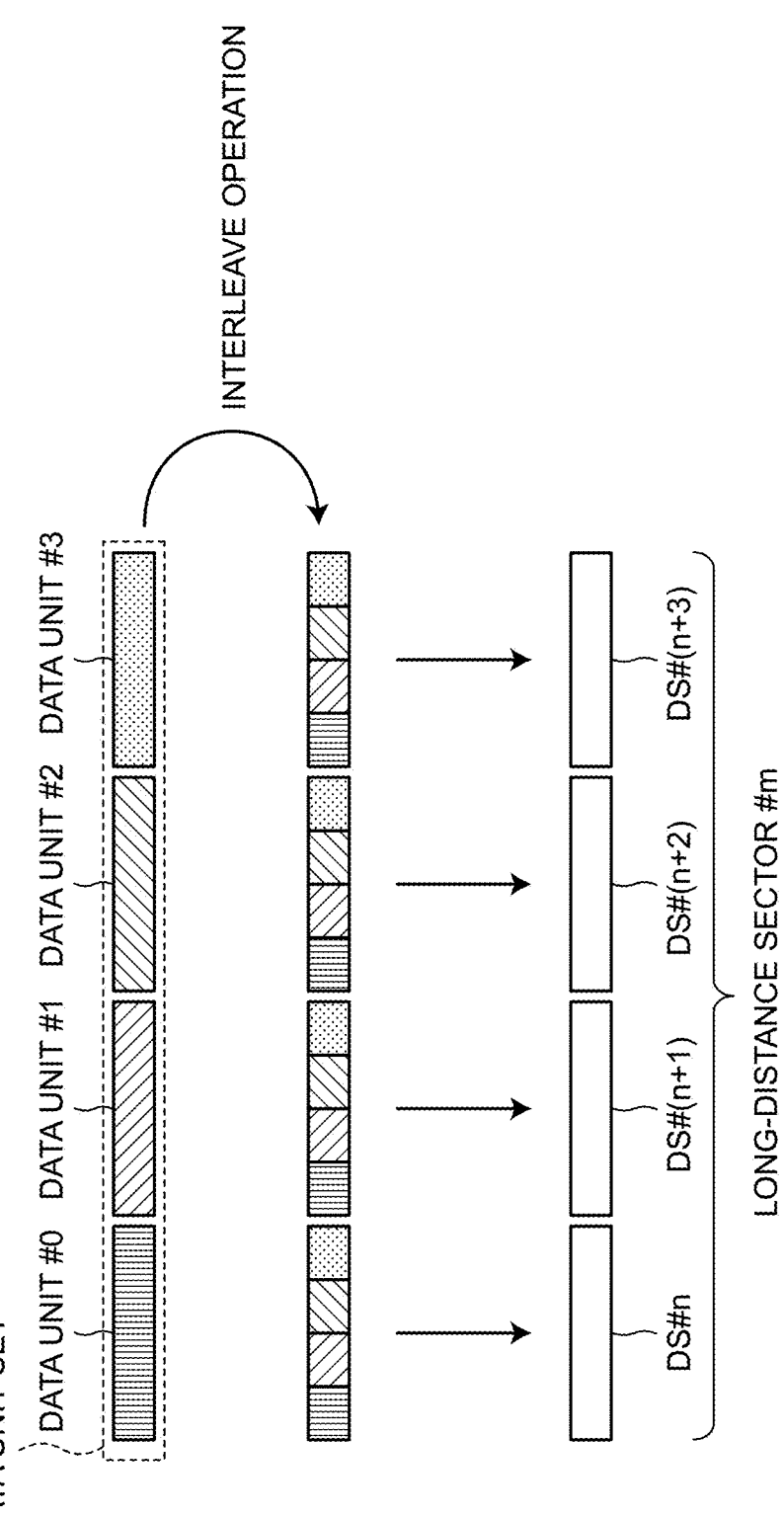
FIG. 5 is a diagram for explaining an example of an interleave operation according to the first embodiment.

FIG. 5 is a diagram for explaining an example of an interleave operation according to the first embodiment. Illustrated in the drawing is an example of an interleave operation executed for a data unit set to be written in one long-distance sector #m. The long-distance sector #m is constituted by data sectors #n to #(n+3). Note that both n and m are integers.

The data unit set to be written in the long-distance sector #m is constituted by, for example, data units #0 to #3.

In the interleave operation, the controller 30 divides each of the data units #0 to #3 into four sub-data units. Then, the controller 30 changes the arrangement order of a total of sixteen sub-data units generated by the division of the data units #0 to #3, and writes the sub-data units to the long-distance sector #m. Specifically, the controller 30 distributes, to the data sectors #n to #(n+3), the four sub-data units generated from the data unit #0. Similarly, the controller 30 distributes, to the data sectors #n to #(n+3), the four sub-data units generated from the data unit #1, the four sub-data units generated from the data unit #2, and the four sub-data units generated from the data unit #3.

Therefore, according to the interleave operation, one data unit is distributed to multiple data sectors DS that constitute a long-distance sector.

Figure 6:
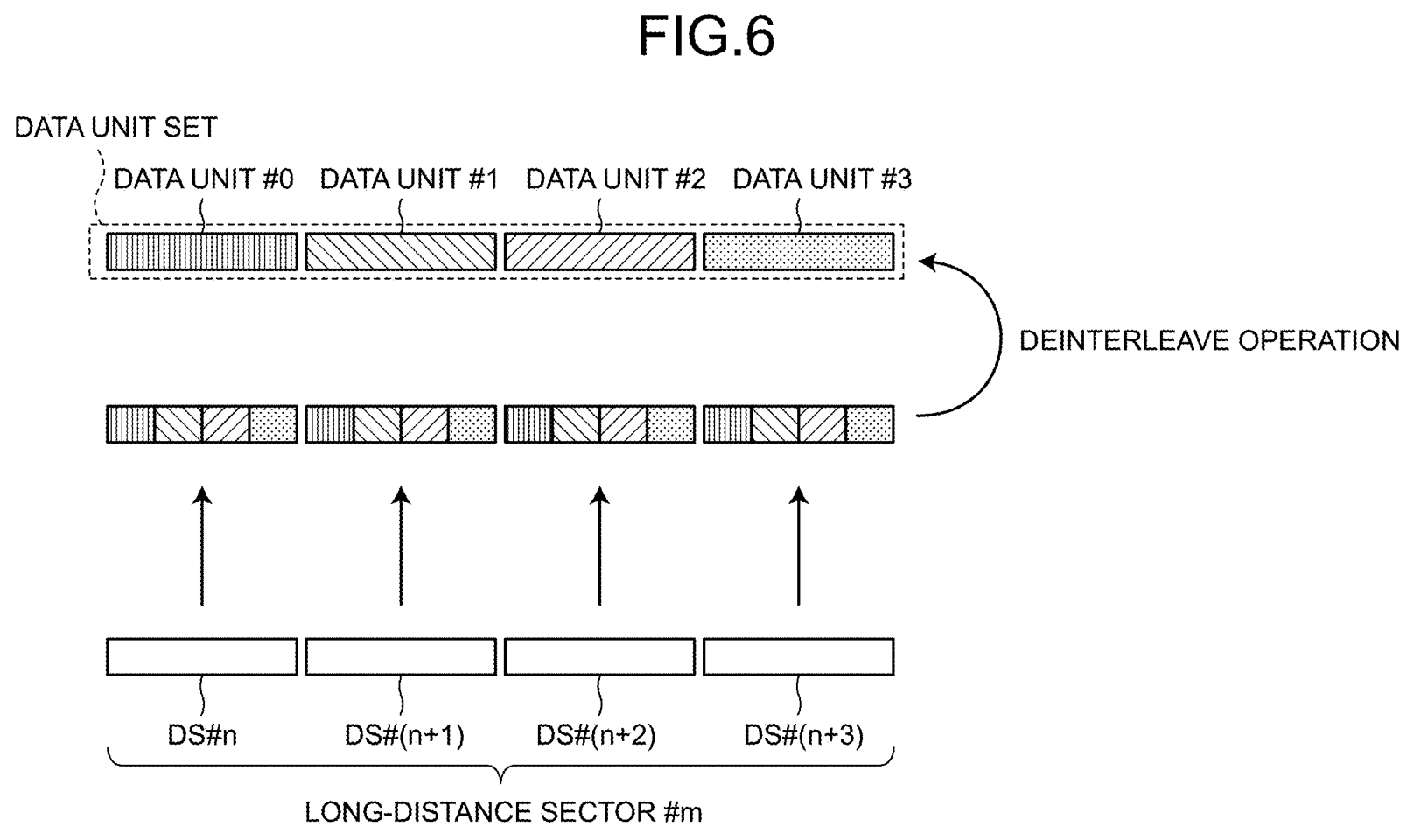

FIG. 6 is a diagram for explaining an example of a deinterleave operation according to the first embodiment. Illustrated in this drawing is an example of a deinterleave operation for data read from the long-distance sector #m.

In the long-distance sector #m, each data unit is distributed and arranged as sub-data units in regions corresponding to the four data sectors DS. In the deinterleave operation, the controller 30 restores the arrangement of the sub-data units to the original arrangement for the data unit set in which the arrangement of the sub-data units has been changed, the data unit set having been read from the long-distance sector #m. As a result, the data unit set before the interleave operation in which the data unit #0, the data unit #1, the data unit #2, and the data unit #3 are arranged in this order is restored.

With the interleave operation and the deinterleave operation executed in the manner described above, resistance to burst errors of the long-distance sector #m can be enhanced. For example, even if a burst error portion is included in data read from one data sector DS, the burst error portion is distributed in multiple data units by the deinterleave operation. Since each data unit has been individually subjected to error correction coding, the distributed burst error portions are corrected by the first error correction for each data unit.

Note that burst errors may occur due to the track width being narrowed by writing to an adjacent track. The narrowing of the track width by writing to an adjacent track is referred to as squeeze writing. It is difficult to read data without errors from an interval in which the track width is significantly narrowed by the squeeze writing, and this may cause burst errors in the data read from the interval. With the interleave operation and the deinterleave operation executed, even if a burst error having a length equal to or less than a data sector DS occurs due to a local squeeze writing having a length equal to or less than the data sector DS, the burst error can be corrected by the first error correction.

As described above, the long-distance sector has a length that covers multiple servo sectors SV in the circumferential direction.

Figure 7:
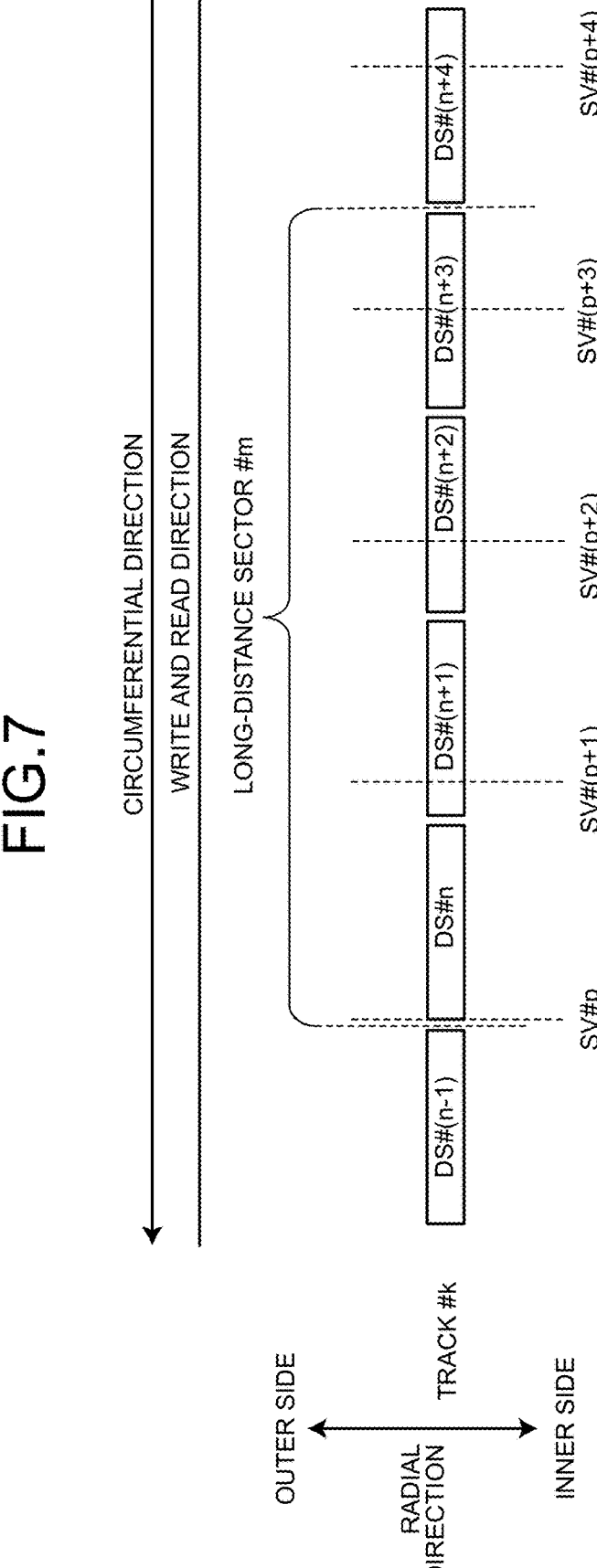
FIG. 7 is a diagram illustrating an example of a positional relationship between a long-distance sector and servo sectors according to the first embodiment.

FIG. 7 is a diagram illustrating an example of a positional relationship between a long-distance sector and servo sectors SV according to the first embodiment. Note that each servo sector SV is a region having a given width in the circumferential direction, and each servo sector SV and each data region are mutually exclusive. However, in order to prevent complication of the drawing, the position of each servo sector SV is simply illustrated by a dotted line.

In the example illustrated in FIG. 7, four servo sectors SV #p to SV #(p+3) are included in a range between the two ends in the circumferential direction of the long-distance sector #m. The servo sector SV #p is present at the head of a data sector DS #n (more precisely, immediately preceding a data sector DS #0), a servo sector SV #(p+1) is present in the middle of a data sector DS #(n+1), a servo sector SV #(p+2) is present in the middle of a data sector DS #(n+2), and a servo sector SV #(p+3) is present in the middle of a data sector DS #(n+3).

The controller 30 executes estimation of the current position of the magnetic head 22 and positioning control of the magnetic head 22 based on the estimated current position, by using servo information read from one servo sector SV when the magnetic head 22 (more precisely, the read element 22r) passes over the servo sector SV. The positioning control of the magnetic head 22 includes seek control for moving the magnetic head 22 to a target track 41 and tracking control for retaining the magnetic head 22 on the target track 41.

In the write operation of writing data to the long-distance sector #m, the controller 30 executes tracking control on the basis of servo information read from at least the four servo sectors SV #p to SV #(p+3).

Specifically, the controller 30 estimates the current position of the magnetic head 22 in each of the four servo sectors SV #p to SV #(p+3) and determines whether or not the magnetic head 22 is in an on-track state. In response to determining that the magnetic head 22 is in the on-track state, the controller 30 executes writing of data.

In response to determining that the magnetic head 22 is not in the on-track state, namely, the magnetic head 22 is in an off-track state, the controller 30 immediately stops writing. Then, in response to determining that the magnetic head 22 is in the on-track state after the magnetic disk 11 rotates one or more times and the magnetic head approaches the same circumferential position, the controller 30 resumes the writing. In this manner, the operation of stopping writing and resuming writing after waiting for rotation is referred to as a write retry operation.

Determination on whether or not the magnetic head 22 is in the on-track state is performed on the basis of whether or not the magnetic head 22 is positioned in a writable range that is provided in the radial direction. The writable range is set for each track 41. A boundary of a writable range is referred to as a drift off level (DOL). Hereinafter, the drift off level is referred to as a DOL.

There are various methods of setting the DOLs. According to the SMR method, among two tracks 41 adjacent to each other in one band, a DOL for one of the two tracks 41 is set on the basis of the position of data that has been already written in the other one of the two tracks 41. That is, the DOL is dynamically set on the basis of the position of data that has been written. Such a DOL that is dynamically set is referred to as a dynamic drift off level (DDOL).

Hereinafter, in a case where data has been written in one of two tracks 41 adjacent to each other and data will be written in the other track, the one of two tracks 41 in which data has been written is referred to as a previous track.

In the first embodiment, the DDOL is set on the basis of not only on the position of data of the previous track but also on a total value of squeeze evaluation amounts. The squeeze evaluation amount is an evaluation amount indicating how much the distance (namely, a track pitch) between the track center of the previous track and the track center of a track 41 to write in is narrowed by referring to a set value of the track pitch. As an example, the squeeze evaluation amount is numerical information that becomes larger as the actual track pitch, namely, the distance between the track center of the previous track and the track center of the track 41 to write in becomes narrower.

As described above, the long-distance sector has the length that covers multiple servo sectors SV, and the interleave operation has been executed on a data unit set written in the long-distance sector. Even in a situation where the actual track pitch is significantly narrowed in one portion of one long-distance sector and a burst error due to squeeze writing occurs in the portion during a read operation to be executed later, if data can be read from another portion of the long-distance sector without errors, data free from errors can be acquired by the first error correction.

In order to estimate, as accurately as possible, whether or not data with no errors can be acquired by the first error correction, it is required to make a determination on the basis of the squeeze evaluation amount in all the multiple servo sectors SV included in the range between two ends of a long-distance sector, instead of part of the multiple servo sectors SV.

Therefore, at the time of the write operation on one long-distance sector (referred to as a long-distance sector to write in), the controller 30 executes an operation described below in order to protect data of another long-distance sector (referred to as an adjacent long-distance sector) located at the same circumferential position as that of the long-distance sector to write in in the previous track. That is, the controller 30 calculates the squeeze evaluation amount at the position of each sector (each servo sector SV or each data sector DS) on the basis of the servo data read from each of the servo sectors SV in the range from the head to the tail of the long-distance sector to write in. Such an operation of calculating the squeeze evaluation amount at the position of each sector (each servo sector SV or each data sector DS) is referred to as an acquisition operation. In the acquisition operation, in a case where there is a sector (servo sector SV or data sector DS) that has not been passed yet, the controller 30 predicts the squeeze evaluation amount in the sector that has not been passed yet. Then, the controller 30 adds up the squeeze evaluation amounts in all the sectors (the servo sectors SV or the data sectors DS) included in the range between the two ends of the long-distance sector to write in and compares the total value of the squeeze evaluation amounts with a threshold value (denoted as a threshold value Th1).

The threshold value Th1 is set in advance as large as possible in a numerical range, in which it is guaranteed that a data unit set free from errors can be acquired from an adjacent long-distance sector by the first error correction. Therefore, in a case where the total value of the squeeze evaluation amounts is smaller than the threshold value Th1, it can be estimated that data free from errors can be acquired from the adjacent long-distance sector. In addition, in a case where the total value of the squeeze evaluation amounts is larger than the threshold value Th1, it can be estimated that there is a possibility that it is difficult to acquire data free from errors from the adjacent long-distance sector.

In a case where the total value of the squeeze evaluation amounts is larger than the threshold value Th1, the controller 30 executes a protection operation that is an operation for protecting the data of the adjacent long-distance sector.

The controller 30 executes tightening of the writable range as the protection operation. The tightening of the writable range is, specifically, tightening of the DDOL. in a case where the magnetic head 22 exceeds the DDOL, the controller 30 immediately stops writing and executes the write retry operation. In a case where the magnetic head 22 has not reached the DDOL, the controller 30 continues the write operation.

Hereinafter, a servo sector SV included in a range between the two ends of a long-distance sector will be simply referred to as a servo sector SV included in the long-distance sector. For example, in the example illustrated in FIG. 7, the four servo sectors SV #p to SV #(p+3) correspond to the servo sectors SV included in the long-distance sector #m.

In the first embodiment, the controller 30 calculates the squeeze evaluation amount for each of the data sectors DS. Note that the controller 30 may calculate the squeeze evaluation amount for each servo sector SV.

An example of the protection operation according to the first embodiment will be described with reference to FIGS. 8 to 10. In this example, a track #(k−1) and a track #k will be described as two tracks 41 adjacent to each other, and the operation when the write operation for the long-distance sector #m on the track #k is executed will be described. That is, in a case where the track #k is used as a reference, the track #(k−1) corresponds to the previous track.

Figure 22:
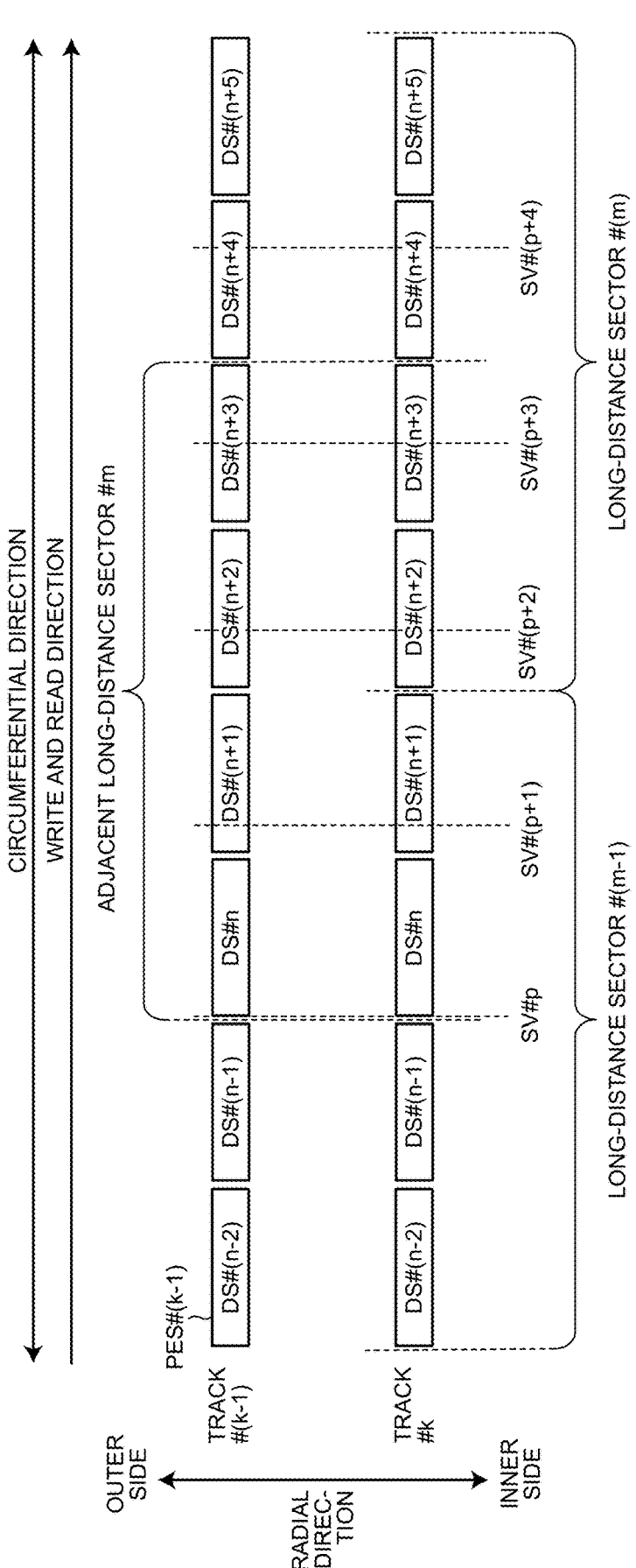
FIG. 22 is a diagram for explaining an example in which sector ends of long-distance sectors are not aligned between tracks.

Although sector ends are aligned among multiple long-distance sectors arranged in a cross-track direction in the examples described above, the technology described in the present disclosure can be applied even in a case where sector ends are not aligned among multiple long-distance sectors arranged in the cross-track direction. FIGS. 8 to 10 are examples in which the long-distance sectors in the track #(k−1) and the track #k are aligned, whereas it is not necessary that heads and tails of long-distance sectors be aligned. For example, long-distance sectors may be shifted for every 4K sectors or every servo sectors SV. As illustrated in FIG. 22, a long-distance sector #m in a track #k may be constituted by DS #(n+2) to DS #(n+5). In this case, a long-distance sector #(m−1) in the track #k is constituted by DS #(n−2) to DS #(n+1). Additionally, in this case, calculation of the total value of squeeze evaluation amounts is performed for an adjacent long-distance sector #m in the track #(k−1). Therefore, in the calculation for the write operation to the long-distance sectors #(m−1) and #m on the track #k, the total value of squeeze evaluation amounts is calculated. In other words, the calculation is performed in the write operation to a portion of the track #k adjacent to the adjacent long-distance sector in the track #(k−1), namely, the portion of the track #k from DS #(n) to DS #(n+3).

In the description below, for the sake of simplicity, description will be given on an operation in the case where long-distance sectors in the track #(k−1)) and the track #k are aligned, namely, the write operation on the long-distance sector #m on the track #k is executed. That is, writing to the long-distance sector #m on the track #k is aligned with the adjacent long-distance sector #m on the track #(k−1) to be protected.

Figure 8:
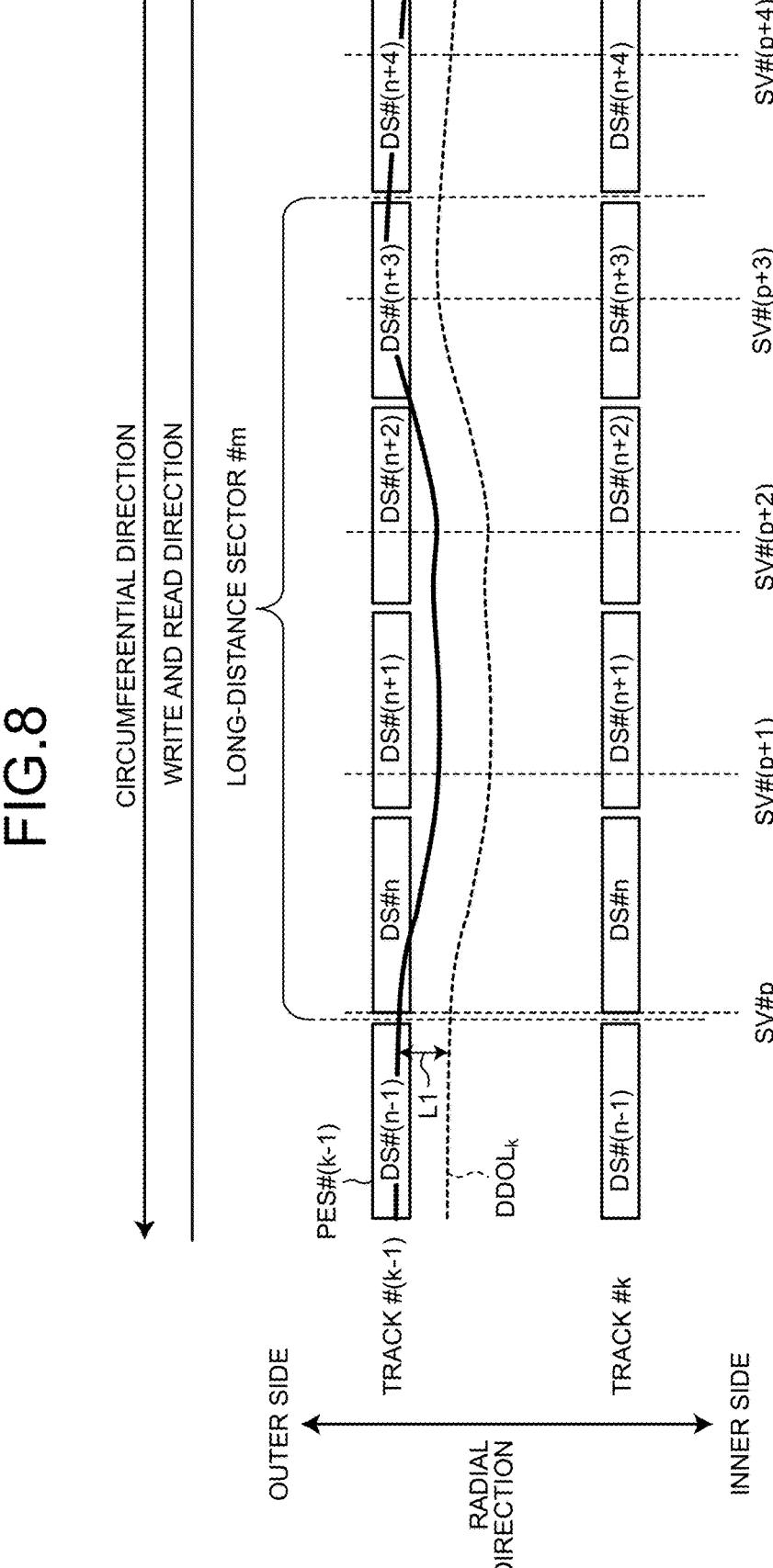
FIG. 8 is a diagram for explaining setting of a DDOL at the time when writing to the previous track has been completed in the first embodiment.

FIG. 8 is a diagram for explaining setting of a DDOL at the time when writing to the previous track (namely, the track #(k−1)) has been completed in the first embodiment.

Illustrated in FIG. 8 is a transition of a position error signal PES #(k−1) in the write operation on the track #(k−1). The position error signal PES #(k−1) indicates an actual locus of the magnetic head 22 at the time of the write operation on the track #(k−1). That is, the position error signal PES #(k−1) indicates the write position of data on the track #(k−1).

In an initial state, the controller 30 sets $DDOL_k$, which is DDOL for the write operation on the track #k, by referring to the write position of the data of the track #(k−1), namely, the position error signal PES #(k−1). Specifically, the controller 30 sets $DDOL_k$ at a position offset from the position error signal PES #(k−1) to the inner side by a predetermined fixed length L1.

Figure 9:
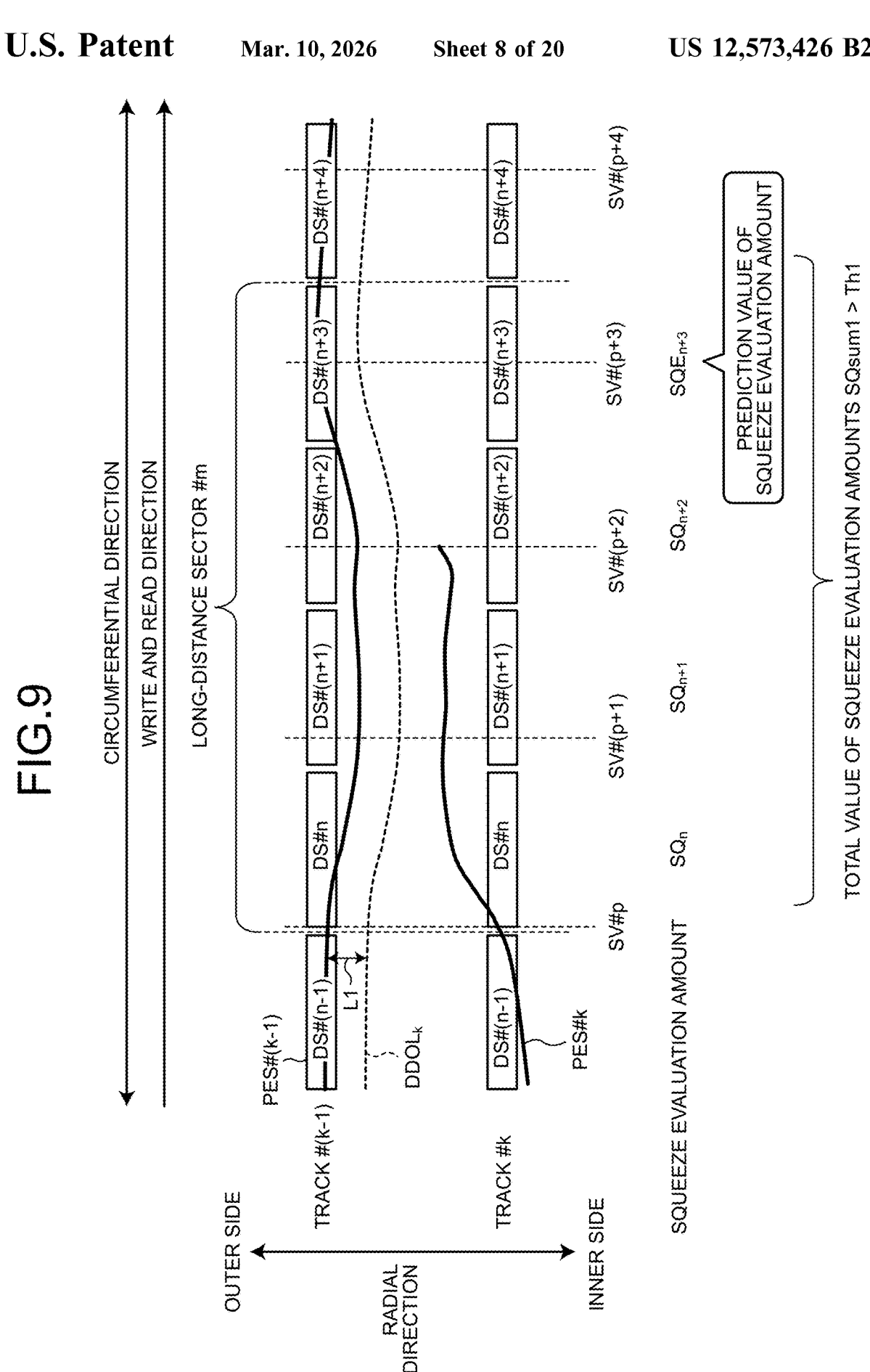
FIG. 9 is a diagram for explaining a write operation on one long-distance sector on one track in the first embodiment.

FIG. 9 is a diagram for explaining the write operation to the long-distance sector #m on the track #k in the first embodiment.

The controller 30 sequentially writes data from the head of the long-distance sector #m on the track #k. Every time the magnetic head 22 passes over the servo sector SV, the controller 30 executes the acquisition operation of calculating a squeeze evaluation amount for each sector, calculation of a total value SQsum1 of the squeeze evaluation amounts, and comparison between the total value SQsum1 of the squeeze evaluation amounts and the threshold value Th1.

In the example illustrated in FIG. 9, as indicated by the position error signal #k, the magnetic head 22 passes over the servo sector SV #p and the servo sector SV #(p+1) while writing data. Then, the magnetic head 22 reaches the servo sector SV #(p+2).

When servo information is read from the servo sector SV #(p+2) by the magnetic head 22, the controller 30 calculates a squeeze evaluation amount $SQ_n$ in the data sector DS #n, a squeeze evaluation amount $SQ_n+1$ in the data sector DS #(n+1), and a squeeze evaluation amount $SQ_{n+2}$ in the data sector DS #(n+2) on the basis of the servo information that has been read.

Various methods are conceivable as a method of calculating the squeeze evaluation amount.

In one example, the controller 30 calculates an actual track pitch TP for each servo sector SV on the basis of on the position error signal PES #(k−1), the position error signal PES #k, and a set value TPset of the track pitch. Then, the controller 30 calculates, for each servo sector SV, a value (referred to as a squeeze amount) obtained by subtracting the actual track pitch TP from the set value TPset of the track pitch. Then, the controller 30 sets the squeeze amount in a servo sector SV closest to one data sector DS as the squeeze evaluation amount in the data sector DS.

In another example, the controller 30 uses the maximum value of squeeze amounts in all servo sectors SV that have been passed among all servo sectors SV from a servo sector SV immediately preceding one data sector DS to a servo sector DV immediately after the data sector DS as the squeeze evaluation amount in the data sector DS.

The controller 30 predicts the squeeze evaluation amount in a remaining data sector DS #(n+3) over which the magnetic head 22 has not yet passed. As a method of calculating a prediction value $SQE_{n+3}$ of the squeeze evaluation amount in the data sector DS #(n+3), various methods are conceivable.

In one example, the maximum value of the squeeze evaluation amounts in all the data sectors DS over which the magnetic head 22 has already passed among the data sectors DS included in the long-distance sector #m to write in is set as the prediction value $SQE_{n+3}$ of the squeeze evaluation amount.

In another example, an average value of the squeeze evaluation amounts in all the data sectors DS over which the magnetic head 22 has already passed among the data sectors DS included in the long-distance sector #m to write in is set as the prediction value $SQE_{n+3}$ of the squeeze evaluation amount.

In still another example, when squeeze amounts or squeeze evaluation amounts in a predetermined number of sectors (servo sectors SV or data sectors DS) arranged consecutively in the circumferential direction are input, a learned neural network model configured to output an estimation value of the squeeze amount or the squeeze evaluation amount in one or more sectors (servo sectors SV or data sectors DS) arranged immediately after the predetermined number of sectors is implemented as an electronic circuit in a storage area. The neural network model has, for example, three layers of an input layer, an intermediate layer, and an output layer. In each layer, there are a large number of neurons, and the neurons are connected in accordance with weights. Learning means to adjust the way how a weight is set in each connection so as to minimize an output error. For example, the controller 30 includes a servo logic unit having a synchronization circuit that acquires the squeeze amount for each servo sector SV, and the squeeze amounts are transmitted to a servo channel unit in the controller 30. The neural network model is implemented in a circuit in the servo channel unit. The controller 30 obtains the prediction value $SQE_{n+3}$ of the squeeze evaluation amount on the basis of the learned neural network model.

In yet another example, the controller 30 is mounted with a circuit that outputs, by a regression formula, estimation values of squeeze amounts or squeeze evaluation amounts in one or more sectors (servo sectors SV or data sectors DS) arranged immediately after a predetermined number of sectors (servo sectors SV or data sectors DS) arranged consecutively in the circumferential direction when squeeze amounts or squeeze evaluation amounts in the predetermined number of sectors are input. The controller 30 obtains the prediction value $SQE_{n+3}$ of the squeeze evaluation amount on the basis of the prediction by the learned regression formula.

As described above, in the acquisition operation, the controller 30 obtains one or more squeeze evaluation amounts (in this example, four squeeze evaluation amounts $SQ_n$, $SQ_{n+1}$, $SQ_{n+2}$, and $SQE_{n+3}$) for the long-distance sector #m to write in on the basis of the actual track pitches TP of all the servo sectors SV included in the long-distance sector #m to write in.

After obtaining the squeeze evaluation amount $SQ_n$ in the data sector DS #n, the squeeze evaluation amount $SQ_{n+1}$ in the data sector DS #(n+1), the squeeze evaluation amount $SQ_{n+2}$ in the data sector DS #(n+2), and the squeeze evaluation amount $SQE_{n+3}$ in the data sector DS #(n+3), the controller 30 calculates a total value SQsum1 of them. Then, the controller 30 compares the total value SQsum1 of the squeeze evaluation amounts with the threshold value Th1.

In a case where the total value SQsum1 of the squeeze evaluation amounts is less than the threshold value Th1, the controller 30 continues writing to the long-distance sector #m to write in. In a case where the total value SQsum1 of the squeeze evaluation amounts exceeds the threshold value Th1, the controller 30 executes the protection operation.

Note that processing in a case where the total value SQsum1 of the squeeze evaluation amounts is equal to the threshold value Th1 can be optionally designed by a designer. For example, the controller 30 may continue writing or may execute the protection operation. It is based on the premise here that the controller 30 continues writing in a case where the total value SQsum1 of the squeeze evaluation amounts is equal to the threshold value Th1.

In the example illustrated in FIG. 9, the total value SQsum1 of the squeeze evaluation amounts exceeds the threshold value Th1, whereby the controller 30 executes the protection operation.

Figure 10:
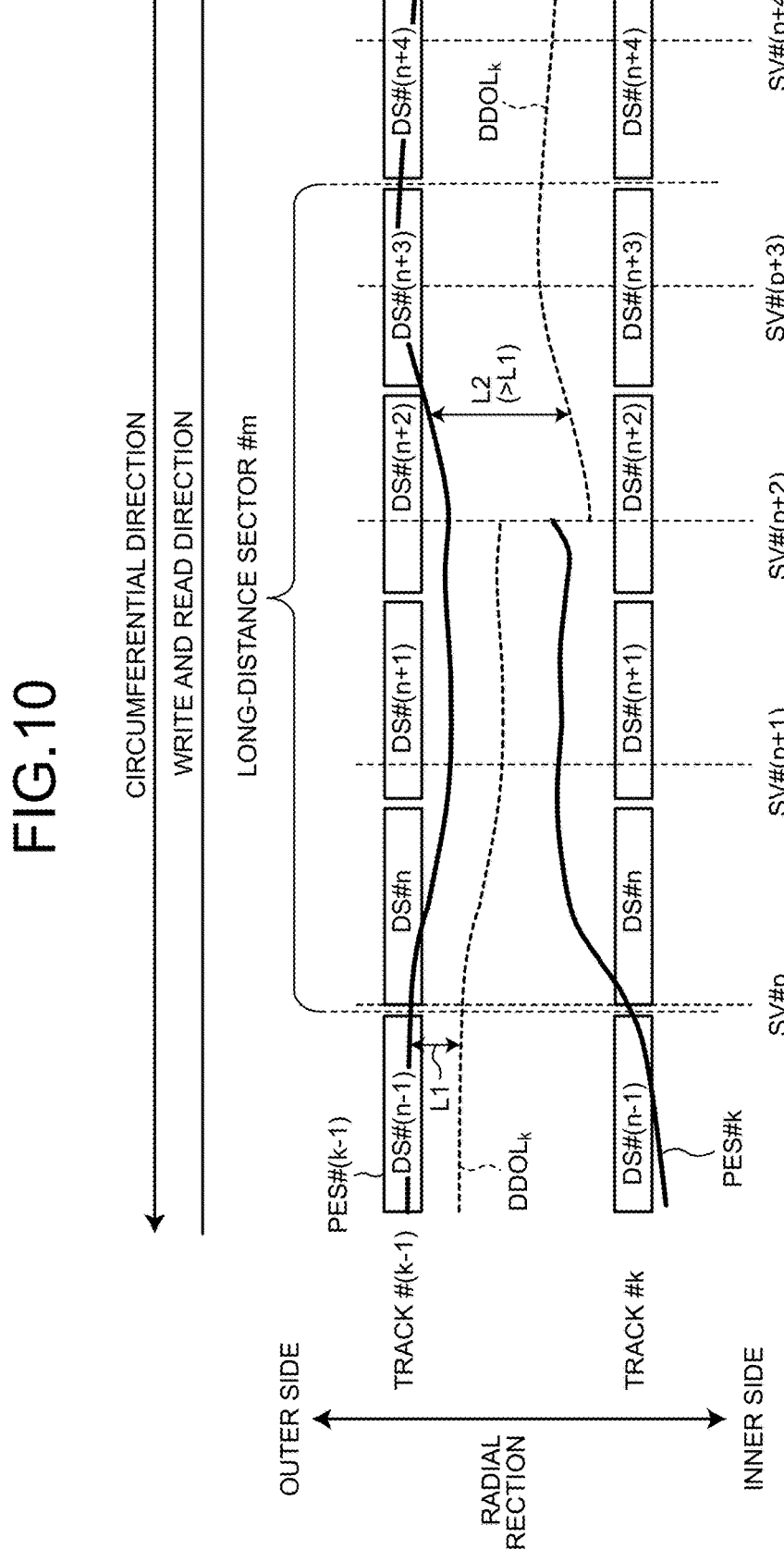
FIG. 10 is a diagram for explaining an example of a protection operation according to the first embodiment.

FIG. 10 is a diagram for explaining an example of the protection operation according to the first embodiment.

When the magnetic head 22 reaches the servo sector SV #(p+2), the total value SQsum1 of the squeeze evaluation amounts exceeds the threshold value Th1, and the controller 30 executes the protection operation. In the protection operation, the controller 30 tightens DDOL behind the servo sector SV #(p+2). That is, as illustrated in FIG. 10, the controller 30 sets $DDOL_k$ at a position offset to the inner side by a length L2 that is longer than L1 from the position error signal PES #(k−1) behind the servo sector SV #(p+2). Accordingly, $DDOL_k$ is moved to the inner side.

Tightening $DDOL_k$ means moving $DDOL_k$ to the inner side as described above. With the $DDOL_k$ tightened, the condition for determining whether or not it is in the on-track state becomes strict. As a result, in the portion where the $DDOL_k$ is tightened, the track width of the previous track is suppressed from being narrowed, and as a result, the data unit set written in the long-distance sector #m in the previous track is prevented from being difficult to read. That is, the data unit set written in the long-distance sector #m of the previous track is protected.

Incidentally, technology to be compared with the first embodiment will be described. The technology to be compared with the first embodiment is referred to as a comparative example. According to the comparative example, the maximum value of squeeze amounts calculated on the basis of the passed servo sectors included in a long-distance sector is regarded as the squeeze amount in the entire long-distance sector. The controller determines whether or not to execute the write retry operation on the basis of a comparison between the maximum value of the squeeze amounts and a given threshold value. However, according to the comparative example, the write retry operation frequently occurs, and the efficiency of the write operation decreases.

In contrast to the comparative example above, when performing writing to a long-distance sector according to the first embodiment, the protection operation is executed on the basis of the total value SQsum1 of the squeeze evaluation amounts in all data sectors DS included in the long-distance sector. Even if the track width of the previous track is significantly narrowed in part of a long-distance sector of the previous track, the write operation can be continued as long as the total value SQsum1 of the squeeze evaluation amounts is less than the threshold value Th1. Therefore, unlike the comparative example, a decrease in the efficiency of the write operation due to frequent write retry operations is suppressed. That is, the magnetic disk apparatus 1 can write data efficiently.

Next, the operation of the magnetic disk apparatus 1 according to the first embodiment will be described.

Figure 11:
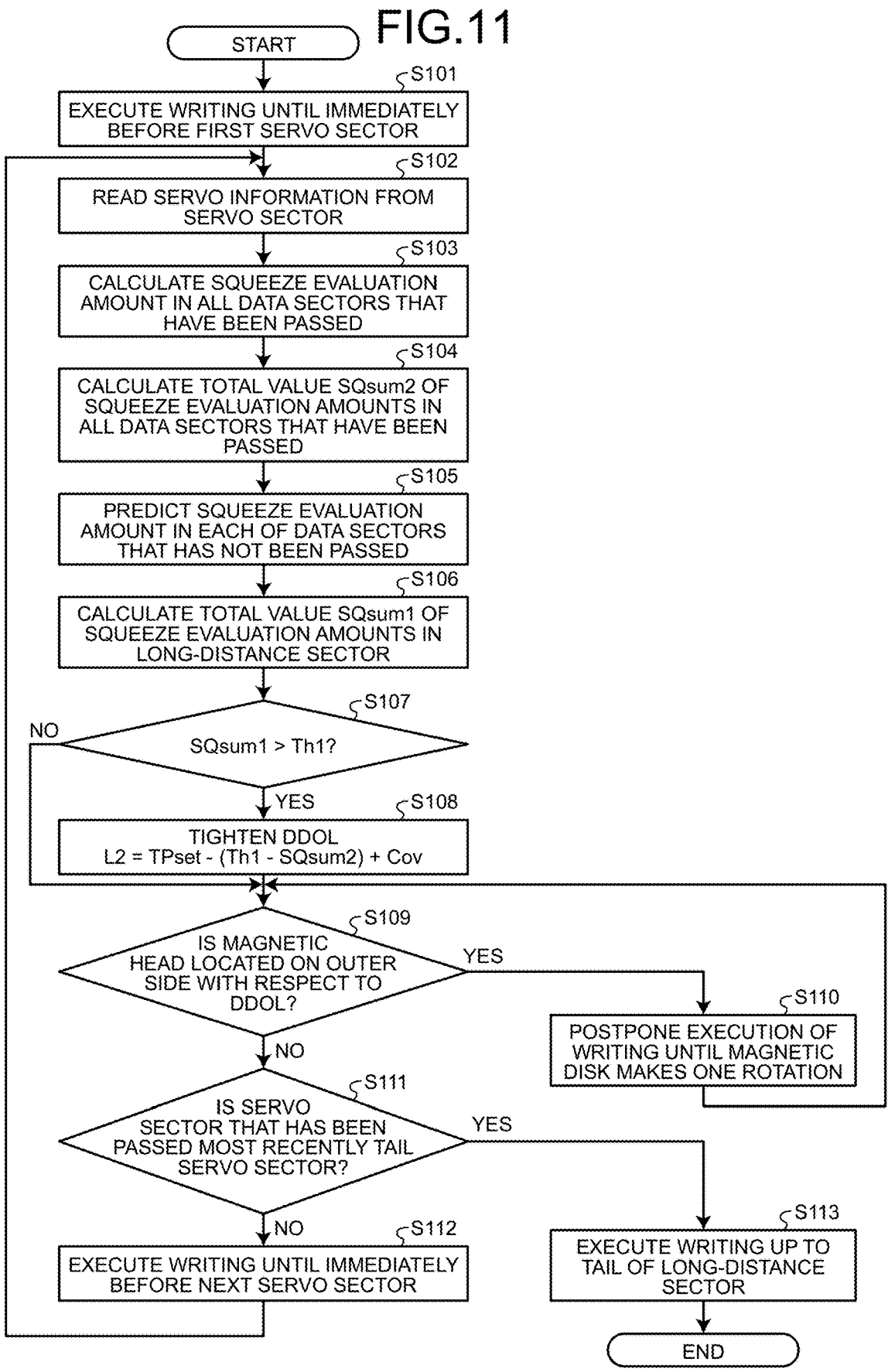
FIG. 11 is a diagram illustrating an example of the write operation on a long-distance sector to write in by a controller according to the first embodiment.

FIG. 11 is a diagram illustrating an example of the write operation on a long-distance sector to write in by the controller 30 according to the first embodiment.

First, the controller 30 executes writing up to a sector immediately preceding a first servo sector SV included in the long-distance sector to write in (S101). Then, after reading servo information from the servo sector SV with the magnetic head 22 (S102), the controller 30 starts the acquisition operation.

In the acquisition operation, the controller 30 first calculates the squeeze evaluation amount in each of data sectors DS that have been passed and are included in the long-distance sector to write in (S103).

Then, the controller 30 calculates the total value of the squeeze evaluation amounts in all the data sectors DS that have been passed and are included in the long-distance sector to write in (S104). The total value obtained by the processing of S104 is denoted as SQsum2.

The controller 30 further predicts the squeeze evaluation amount in each of data sectors DS that has not been passed yet but included in the long-distance sector to write in (S105).

After obtaining the squeeze evaluation amounts in all the data sectors DS included in the long-distance sector to write in by the acquisition operation, the controller 30 calculates the total value SQsum1 of these squeeze evaluation amounts (S106).

The controller 30 determines whether or not the total value SQsum1 is larger than the threshold value Th1 (S107).

If the total value SQsum1 is larger than the threshold value Th1 (S107: Yes), the controller 30 executes tightening of the DDOL (S108). Specifically, the controller 30 calculates the length L2 on the basis of following Equation (1) and moves the DDOL to a position offset from that of the position error signal of the previous track to the inner side by the length L2.

$$L2 = TPset - (Th1 - SQsum2) + Cov \qquad (1)$$

TPset denotes a set value of the track pitch. Cov denotes a margin set in consideration of an overrun. In a case where the off-track state occurs, the magnetic head 22 may move towards the previous track beyond the DDOL in a period from the occurrence of the off-track state to the stop of writing. A distance that the magnetic head 22 may move radially beyond the DDOL before the writing stops is referred to as an overrun. Cov is a length corresponding to a presumed overrun.

In a case where the total value SQsum1 is larger than the threshold value Th1, it is expected that it will be difficult to read data of an adjacent long-distance sector if the write operation is continued as it is. The allowable amount of the squeeze amounts for preventing the difficulty in reading the data of the adjacent long-distance sector can be expressed by (SQsum2−Th1). Therefore, the controller 30 can prevent the difficulty in reading the data of the adjacent long-distance sector unless the magnetic head 22 moves beyond a line separated from the position error signal of the previous track by a length ((TPset−(Th1−SQsum2)). However, since the overrun may actually occur, the DDOL is set at a position offset to the inner side by Cov from the line determined by the length ((TPset−(Th1−SQsum2)) in consideration of the overrun.

If the total value SQsum1 is not larger than the threshold value Th1 (S107: No), or after the processing of S108, the controller 30 determines whether or not the magnetic head 22 is positioned on the outer side (in other words, the previous track side) with respect to the DDOL (S109).

If the magnetic head 22 is positioned on the outer side with respect to the DDOL (S109: Yes), it is estimated that the magnetic head 22 is in the off-track state. Therefore, the controller 30 stops writing and postpones execution of writing until the magnetic disk 11 makes one rotation (S110). Then, when the magnetic disk 11 makes one rotation and the magnetic head 22 approaches again the position in the circumferential direction where the writing has stopped, the controller 30 executes the processing of S109 again.

If the magnetic head 22 is not positioned on the outer side with respect to the DDOL (S109: No), it can be estimated that the magnetic head 22 is in the on-track state. Therefore, the controller 30 executes writing. Specifically, first, the controller 30 determines whether or not a servo sector SV that has been passed most recently is the tail servo sector SV included in the long-distance sector to write in (S111).

If the servo sector SV that has been passed most recently is not the tail servo sector SV included in the long-distance sector to write in (S111: No), the controller 30 executes writing up to a sector immediately preceding the next servo sector SV (S112). Then, the control transitions to S102.

If the servo sector SV that has been passed most recently is the tail servo sector SV included in the long-distance sector to write in (S111: Yes), the controller 30 executes writing up to the tail of the long-distance sector to write in (S113). Then, the write operation ends.

Note that, in the series of operations illustrated in FIG. 11, the total value SQsum1 is an example of the first total value. The threshold value Th1 is an example of the first threshold value. The total value SQsum2 is an example of a second total value. Each of the servo sectors SV included in the long-distance sector to write in is an example of the first servo sector. The servo sector SV over which the magnetic head 22 has passed among the multiple servo sectors SV included in the long-distance sector to write in is an example of a second servo sector. The servo sector SV over which the magnetic head 22 has not passed yet among the multiple servo sectors SV included in the long-distance sector to write in is an example of a third servo sector.

In addition, in the series of operations illustrated in FIG. 11, the processing of S112 or S113 that is executed after determined No in the determination processing of S109 corresponds to the write retry operation.

Figure 12:
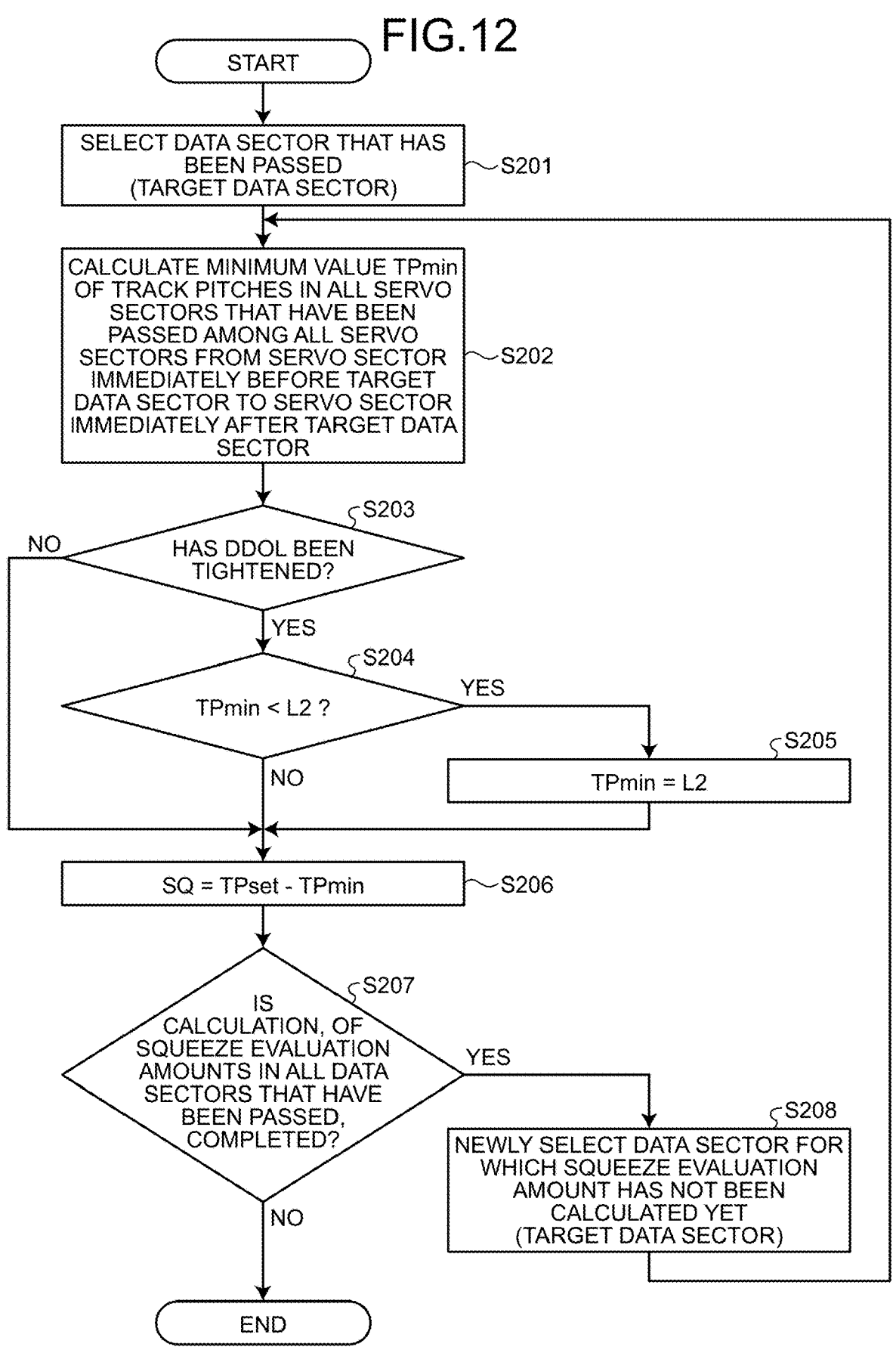
FIG. 12 is a flowchart illustrating an example of an operation of calculating a squeeze evaluation amount in a servo sector that has been passed according to the first embodiment.

FIG. 12 is a flowchart illustrating an example of the operation of calculating the squeeze evaluation amounts in the servo sectors SV having been passed, namely, the processing of S103 illustrated in FIG. 11 according to the first embodiment.

First, the controller 30 selects one data sector DS over which the magnetic head 22 has passed, from the long-distance sector to write in (S201). The selected one data sector DS is referred to as a target data sector DS.

The controller 30 calculates the minimum value TPmin of the track pitches TP in all the servo sectors SV that have been passed among all the servo sectors SV from the servo sector SV immediately preceding the target data sector DS to the servo sector SV immediately after the target data sector DS (S202).

In the first embodiment, in a case where the target data sector DS is present over one or more data regions, the worst value (namely, the maximum value) of the squeeze amounts calculated in all the servo sectors SV located immediately preceding to immediately after the one or more data regions is regarded as the squeeze amount in the target data sector DS. As a result, it is possible to evaluate the squeeze amount in the worst case, namely, the case where the track width of the adjacent long-distance sector is narrowed most in the target data sector DS.

Therefore, in the example illustrated in FIG. 12, in a case where the target data sector DS is present over one or more data regions, first, the minimum value TPmin of the track pitches in all the servo sectors SV located immediately preceding to immediately after the one or more data regions is calculated.

Subsequent to S202, the controller 30 determines whether or not the DDOL has been tightened (S203). That is, the controller 30 determines whether or not DDOL has been moved to the position offset from the position error signal of the previous track to the inner side by the length L2.

If the DDOL has been tightened (S203: Yes), the controller 30 determines whether or not the minimum value TPmin is smaller than L2 (S204).

When the controller 30 detects that the magnetic head 22 is positioned on the outer side (namely, the previous track side) with respect to the DDOL, the controller 30 cannot continue writing. However, since writing is continued at the time when the processing of S103 is executed, even if the minimum value TPmin is smaller than L2, it is conceivable that the magnetic head 22 is not actually positioned on the outer side with respect to the DDOL. Therefore, if the minimum value TPmin is smaller than L2 (S204: Yes), the controller 30 replaces the minimum value TPmin with the value of L2 (S205).

If the DDOL has not been tightened (S203: No), or if the minimum value TPmin is not smaller than L2 (S204: No), or after the processing of S205, the controller 30 calculates the squeeze evaluation amount SQ in the target data sector DS by using the following Equation (2) (S206).

$$SQ = TPset - TPmin \qquad (2)$$

The controller 30 determines whether or not the calculation of the squeeze evaluation amounts SQ in all the data sectors DS having been passed, the data sectors DS included in the long-distance sector to write in, has been completed (S207). Note that, in the present specification, the data sectors DS having been passed include not only the data sectors DS in which the magnetic head 22 has passed the entire region of the data sector DS but also a data sector DS in which the magnetic head 22 has passed a partial region of the data sector DS.

If a data sector DS for which the squeeze evaluation amount SQ has not yet been calculated remains among all the data sectors DS having been passed, the data sectors DS included in the long-distance sector to write in (S207: No), the controller 30 selects one data sector DS for which the squeeze evaluation amount SQ has not yet been calculated as a new target data sector DS (S208). Then, the control transitions to S202.

If calculation of the squeeze evaluation amounts SQ in all the data sectors DS having been passed, the data sectors DS included in the long-distance sector to write in, has been completed (S207: Yes), the operation of calculating the squeeze evaluation amounts SQ in the data sectors DS having been passed ends.

FIG. 13 is a table illustrating an example of the squeeze evaluation amounts SQ and SQE for each data sector DS calculated in the magnetic disk apparatus 1 according to the first embodiment. In the example illustrated in the table, the squeeze evaluation amount SQ in a data sector DS having been passed is calculated in accordance with the operation illustrated in FIG. 12. In addition, the maximum value of the squeeze evaluation amounts SQ in all the data sectors DS that have been passed is used as the prediction value SQE of the squeeze evaluation amount in a data sector DS that has not passed yet.

In FIG. 13, indicated in columns of the data sectors DS #n to DS #(n+3) are the squeeze evaluation amounts SQ and SQE calculated when the magnetic head 22 is positioned on the servo sectors SV #p to SV #(p+3) individually. The numerical information in parentheses indicates an actual track pitch TP detected at each of the servo sectors SV. A cell hatched with oblique lines indicates a prediction value SQE of the squeeze evaluation amount.

Moreover, illustrated in FIG. 13 is the total values SQsum1 and SQsum2 calculated when the magnetic head 22 is positioned on the servo sectors SV #p to SV #(p+3) individually.

Note that, in the example illustrated in FIG. 13, the set value TPset of the track pitch is 50 nm, the threshold value Th1 is 24 nm, and the margin Cov for the overrun is 2 nm.

As illustrated in the row of the servo sector SV #p, the track pitch TP in the servo sector SV #p when the magnetic head 22 reached the servo sector SV #p was 50 nm. Since the magnetic head 22 has reached the head of the data sector DS #n, the controller 30 selects the data sector DS #n as the target data sector DS and calculates the minimum value TPmin of the track pitch for the data sector DS #n. Since only the servo sector SV #p has passed among the servo sectors from the servo sector SV #p immediately preceding the data sector DS #n to the servo sector SV #(p+1) immediately after the data sector DS #n, the controller 30 obtains 50 nm, which is the track pitch TP in the servo sector SV #p, as the minimum value TPmin of the track pitches. Since the DDOL has not been tightened, the controller 30 subtracts 50 nm, which is the minimum value TPmin of the track pitches, from 50 nm, which is the set value TPset of the track pitch, thereby obtaining 0 nm as the squeeze evaluation amount SQ in the data sector DS #n.

In addition, since the maximum value of the squeeze evaluation amounts SQ in all the data sectors DS having been passed in the long-distance sector to write in is 0 nm, the prediction values $SQE_{n+1}$, $SQE_{n+2}$, and $SQE_{n+3}$ of the squeeze evaluation amounts in the data sectors DS #(n+1) to DS #(n+3) are all set to 0 nm.

At this point, the total value SQsum1 of the squeeze evaluation amounts is 0 nm and does not exceed the threshold value Th1. Therefore, the protection operation is not started.

As illustrated in the row of the servo sector SV #(p+1), the track pitch TP in the servo sector SV #(p+1) when the magnetic head 22 reached the servo sector SV #(p+1) was 44 nm. In a case where the data sector DS #n is selected as a target data sector DS, the controller 30 obtains 44 nm as the minimum value TPmin. Therefore, the controller 30 obtains 6 nm as the squeeze evaluation amount $SQ_n$ by subtracting 44 nm, which is the minimum value TPmin of the track pitch, from 50 nm, which is the set value TPset of the track pitch.

In a case where the data sector DS #(n+1) is selected as the target data sector DS, the controller 30 obtains 44 nm as the minimum value TPmin. Therefore, the controller 30 obtains 6 nm as the squeeze evaluation amount $SQ_{n+1}$ by subtracting 44 nm, which is the minimum value TPmin of the track pitch, from 50 nm, which is the set value TPset of the track pitch.

Since the maximum value of the squeeze evaluation amounts SQ in all the data sectors DS having been passed in the long-distance sector to write in is 6 nm, the prediction values $SQE_{n+2}$ and $SQE_{n+3}$ of the squeeze evaluation amounts in the data sectors DS #(n+2) to DS #(n+3) are all set to 6 nm.

At this point, the total value SQsum1 of the squeeze evaluation amounts is 24 nm and does not exceed the threshold value Th1. Therefore, the protection operation is not started.

As illustrated in the row of the servo sector SV #(p+2), the track pitch TP in the servo sector SV #(p+2) when the magnetic head 22 reached the servo sector SV #(p+2) was 43 nm. In a case where the data sector DS #n is selected as a target data sector DS, the controller 30 obtains 44 nm as the minimum value TPmin. Therefore, the controller 30 obtains 6 nm as the squeeze evaluation amount $SQ_n$ by subtracting 44 nm as the minimum value TPmin of the track pitch, from 50 nm as the set value TPset of the track pitch.

In a case where the data sector DS #(n+1) is selected as the target data sector DS, the controller 30 obtains 43 nm as the minimum value TPmin. Therefore, the controller 30 obtains 7 nm as the squeeze evaluation amount $SQ_{n+1}$ by subtracting 43 nm, which is the minimum value TPmin of the track pitch, from 50 nm, which is the set value TPset of the track pitch.

Since the maximum value of the squeeze evaluation amounts SQ in all the data sectors DS having been passed in the long-distance sector to write in is 7 nm, the prediction value $SQE_{n+3}$ of the squeeze evaluation amount in the data sector DS #(n+3) is set to 7 nm.

At this point, the total value SQsum1 of the squeeze evaluation amounts is 28 nm, which exceeds the threshold value Th1. Therefore, the protection operation is started. Specifically, the controller 30 calculates the length L2 by using Equation (1) and sets the DDOL at the position offset from the position indicated by the position error signal of the previous track to the inner side by the length L2.

In the example illustrated in FIG. 13, the set value TPset of the track pitch is 50 nm, the threshold value Th1 is 24 nm, and the margin Cov for the overrun is 2 nm. Moreover, the total value SQsum2 when the magnetic head 22 reaches the servo sector SV #(p+2) is 20 nm. Therefore, the controller 30 obtains 48 nm as the length L2 by using Equation (1). The controller 30 sets the DDOL at the position offset by 48 nm to the inner side from the position indicated by the position error signal of the previous track.

When the magnetic head 22 reaches the servo sector SV #(p+2), the magnetic head 22 is positioned at a position that is offset by 43 nm to the inner side from the position indicated by the position error signal of the previous track. That is, the magnetic head 22 is positioned on the outer side with respect to the DDOL after tightening. Therefore, the controller 30 stops writing, and, when the magnetic head 22 reaches the servo sector SV #(p+2) again, the controller 30 determines whether or not to resume writing on the basis of the DDOL.

In the example illustrated in FIG. 13, writing is resumed when the magnetic head 22 reaches the servo sector SV #(p+2) again. When the magnetic head 22 reached the servo sector SV #(p+1), the track pitch TP in the servo sector SV #(p+3) was 48 nm as illustrated in the row of the servo sector SV #(p+3). The controller 30 sequentially selects the data sector DS #n, the data sector DS #(n+1), and the data sector #(n+2) as the target data sectors DS, thereby acquiring 6 nm as the squeeze evaluation amount $SQ_n$, 7 nm as the squeeze evaluation amount $SQ_{n+1}$, and 7 nm as the squeeze evaluation amount $SQ_{n+2}$.

Note that, in the write retry operation, the controller 30 may acquire the squeeze evaluation amounts SQ of the data sector DS #n, the data sector DS #(n+1), and the data sector #(n+2) by a method similar to a method applied before the write retry operation.

Alternatively, the controller 30 may store the squeeze evaluation amounts SQ of the data sector DS #n, the data sector DS #(n+1), and the data sector #(n+2) calculated before the write retry operation in a storage area and read these squeeze evaluation amounts SQ from this storage area in the write retry operation.

In the write retry operation, in a case where the data sector DS #(n+3) is selected as the target data sector DS, the controller 30 obtains 43 nm as the minimum value TPmin.

However, the minimum value TPmin is smaller than 48 nm, which is the length L2. Therefore, the controller 30 sets 48 nm, which is the value of the length L2, as the minimum value TPmin. Then, the controller 30 acquires 2 nm as the squeeze evaluation amount $SQ_{n+3}$ in the data sector DS #(n+3) by using Equation (2).

At this point, the total value SQsum1 of the squeeze evaluation amounts is 24 nm and does not exceed the threshold value Th1. Therefore, the protection operation is not started, and writing is continued.

Note that, in the above description, the controller 30 has tightened the DDOL as the protection operation. The example of the protection operation is not limited to this.

In one example, the controller 30 may immediately stop writing without performing the DDOL tightening and then execute the write retry operation as the protection operation.

In another example, the controller 30 may perform sector slipping as the protection operation.

Figure 14:
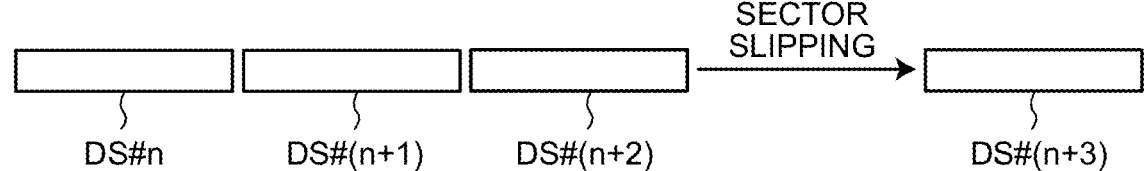
FIG. 14 is a schematic diagram for explaining an operation of sector slipping according to the first embodiment.

FIG. 14 is a schematic diagram for explaining the operation of sector slipping according to the first embodiment. As illustrated in the drawing, in the sector slipping, a data sector DS included in the long-distance sector to write in is relocated behind the initially set position. Alternatively, the sector slipping may be performed for a whole long-distance sector. That is, in addition to DS #(n+3), DS #n, DS #(n+1), and DS #(n+2) having been written in are made to slip. In this case, DS #n after the slipping is disposed at a writing position of DS #0 in a long-distance sector subsequent to DS #(n+3) that has originally been the writing target. That is, sector slipping for the whole long-distance sector is executed.

In addition, in the example of the operation illustrated in FIG. 11, the controller 30 waits for rotation of the magnetic disk 11 until the magnetic head 22 does not go to the outer side with respect to the DDOL (namely, the processing of S110). An upper limit may be set for the number of times of waiting for rotation of the magnetic disk 11. In a case where the number of times of waiting for rotation of the magnetic disk 11 reaches the upper limit, the controller 30 may execute the sector slipping.

The upper limit of the number of times of waiting for rotation of the magnetic disk 11 may be different between a case where the DDOL is tightened and a case where the DDOL is not tightened. For example, the upper limit in the case where the DDOL is tightened is set to have a value smaller than that of the upper limit in the case where the DDOL is not tightened.

As described above, according to the first embodiment, the controller 30 operates as follows in the write operation to one of long-distance sectors. That is, the controller 30 executes the acquisition operation of acquiring one or more squeeze evaluation amounts based on the track pitch TP in each of all the two or more servo sectors SV included in the long-distance sector to write in. In the acquisition operation, the controller 30 calculates the squeeze evaluation amount for a servo sector SV over which the magnetic head 22 has passed on the basis of the position error signal of the previous track and the position error signal of the track 41 including the long-distance sector to write in. In the acquisition operation, the controller 30 predicts the squeeze evaluation amount for a servo sector SV that the magnetic head 22 has not passed yet. In a case where the total value SQsum1, which is the total value of the squeeze evaluation amounts of the entire long-distance sector to write in, exceeds the threshold value Th1, the controller 30 executes the protection operation for protecting the data of the previous track.

Therefore, unlike the comparative example, a decrease in the efficiency of the write operation due to frequent write retry operations is suppressed. That is, the magnetic disk apparatus 1 can write data efficiently.

Moreover, according to the first embodiment, the controller 30 executes the tightening of the writable range in the protection operation.

Therefore, the data of the previous track is protected.

In addition, according to the first embodiment, the total value SQsum2 of the squeeze evaluation amounts based on all the servo sectors SV that the magnetic head 22 has passed among all the two or more servo sectors SV included in the long-distance sector to write in is calculated. In the protection operation, the controller 30 calculates the length L2 on the basis of the total value SQsum2 and sets the DDOL on the basis of the length L2.

Therefore, the data of the previous track is protected.

Note that, in the example illustrated in FIG. 4, the parity sector does not belong to any long-distance sector. The parity sector may be included in the long-distance sector at the tail of the track 41. For example, in FIG. 4, the parity sector may be included in the long-distance sector #3. In this case, unlike any of the long-distance sectors #0 to #2, the long-distance sector #3 is constituted by five data sectors DS #12 to DS #16. For the long-distance sector #3, the controller 30 calculates the total value SQsum1, which is the total value of the squeeze evaluation amounts of the entire long-distance sector, from the five data sectors DS #12 to DS #16 and compares the total value SQsum1 with the threshold value Th1. Note that, as the threshold value Th1 used for the long-distance sector #3, a value different from the threshold value Th1 used in the long-distance sectors #0 to #2 is applied.

As described above, according to the first embodiment, the controller 30 predicts the squeeze evaluation amount on the basis of the servo sector SV, over which the magnetic head 22 has not yet passed, on the basis of the squeeze evaluation amounts based on the servo sectors SV over which the magnetic head 22 has passed.

The first embodiment can be variously modified. Some modifications of the first embodiment will be described below. In each of the modifications of the first embodiment, matters different from those in the first embodiment will be described. The same matters as those of the first embodiment will be omitted or briefly described.

First Modification

In the first embodiment, the SMR method is applied as the recording method. In a first modification, a magnetic disk apparatus 1 executes writing of data by the CMR method.

Figure 15:
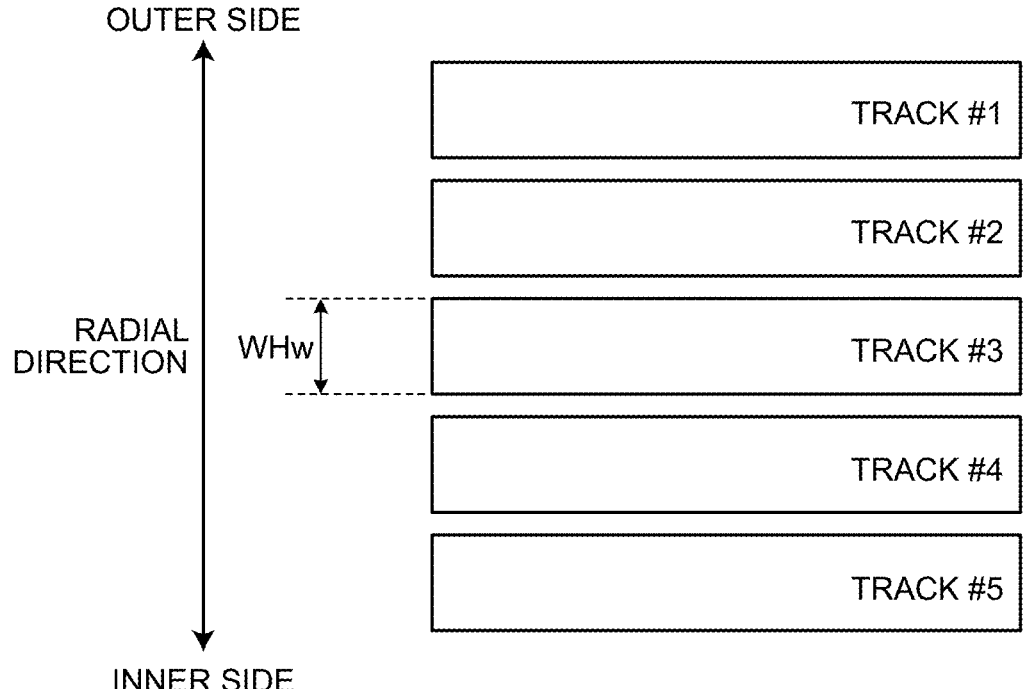
FIG. 15 is a schematic diagram for explaining a CMR method used in a magnetic disk apparatus of a first modification.

FIG. 15 is a schematic diagram for explaining the CMR method used in the magnetic disk apparatus 1 of the first modification. As illustrated in the drawing, according to the CMR method, tracks are arranged in such a manner so as not to overlap with adjacent tracks in the radial direction. In other words, in the CMR method, data of two tracks adjacent to each other in the radial direction of the magnetic disk 11 is written so as not to overlap with each other. According to the CMR method, since the width of each of the tracks is the same as the width (WHw) of the write element 22w, data at an optional position can be updated. Therefore, according to the CMR method, although the recording density is lower than that of the SMR method, high random access performance can be achieved.

A controller 30 can execute the operations described with reference to FIGS. 11 and 12.

Second Modification

A second modification is different from the first embodiment in the configuration of the long-distance sectors.

Figure 16:
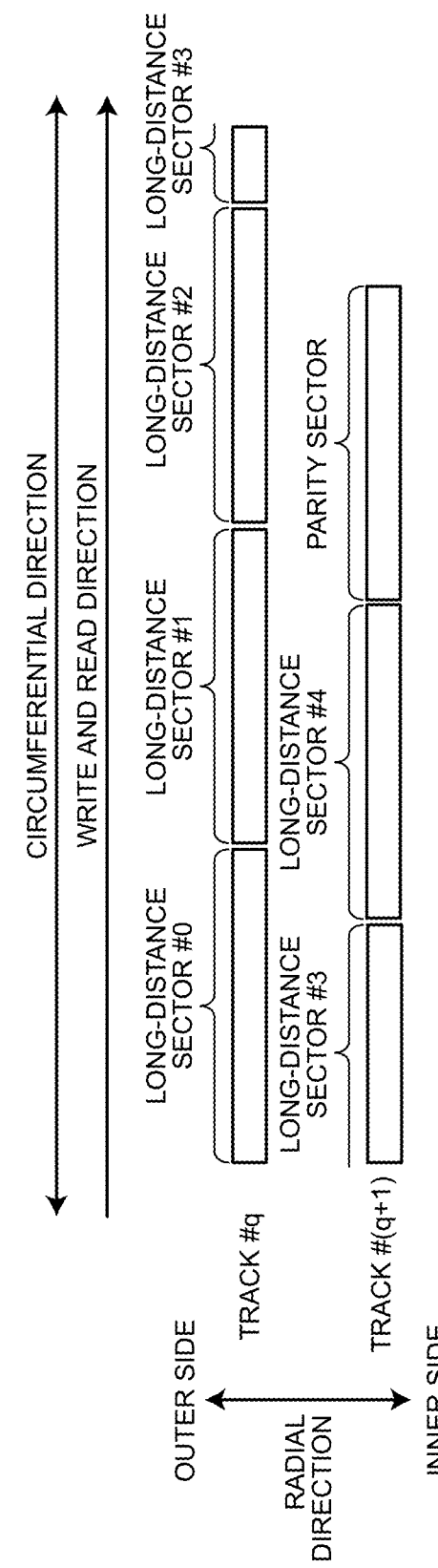
FIG. 16 is a diagram for explaining an example of a configuration of a long-distance sector according to a second modification.

FIG. 16 is a diagram for explaining an example of a configuration of long-distance sectors according to the second modification. Note that, in this drawing, servo sectors SV are not illustrated.

In the second modification, the controller 30 combines multiple data units received from the host 2 into one data block and encodes the data block by an error correction code. One long-distance sector has a capacity capable of storing one encoded data block.

A magnetic disk 11 includes a long-distance sector in which the parity is stored. The controller 30 generates the parity on the basis of multiple encoded data blocks stored in multiple long-distance sectors. Then, the controller 30 stores the generated parity in a specific long-distance sector.

The parity may be generated on the basis of multiple data blocks stored in multiple long-distance sectors included in one track 41. Alternatively, the parity may be generated on the basis of multiple data blocks stored in multiple long-distance sectors included in multiple tracks 41. In the example illustrated in FIG. 16, the parity is generated on the basis of five data blocks stored in five long-distance sectors #0 to #4 included in a track #q and a track #(q+1). The generated parity is stored in the long-distance sector immediately behind the long-distance sector #4.

Even in a case where the long-distance sectors have the configuration illustrated in FIG. 16, the controller 30 can execute the operation described with reference to FIG. 11.

Note that, in the example illustrated in FIG. 11, the controller 30 calculates the squeeze evaluation amount SQ or the prediction value SQE of the squeeze evaluation amount for each data sector DS. In a third modification, the controller 30 calculates the squeeze evaluation amount SQ or the prediction value SQE of the squeeze evaluation amount for each servo sector SV included in a long-distance sector. In the second modification, the controller 30 may acquire the squeeze amount as the squeeze evaluation amount or may acquire the squeeze evaluation amount by performing optional processing on the squeeze amount.

Third Modification

As described above, according to the SMR method, the position of each track 41 is set in such a manner that the track width TW is narrower than that of the CMR method. Therefore, the DDOL is adopted so as not to cause the actual track pitch to become narrower than necessary.

In the case where the DDOL is used, the position error signal of the previous track is required for setting the DDOL. Thus, the controller 30 needs to store the position error signal of the previous track in a storage area.

On the other hand, according to the CMR method, since the track width TW is wider than that of the SMR method or the like, no strict control of the track pitch is required as in the SMR method. That is, instead of the DDOL, the DOL fixedly set on the basis of a design position, namely, an ideal radial position, of each track 41 can be adopted. In a case where the DOL is set on the basis of the design position of each track 41, the controller 30 does not need to record another position error signal of a track 41 to be accessed.

In the third modification, description will be given on a controller 30 that executes data writing by the CMR method and sets the DOL with reference to the design position of each track 41.

Figure 17:
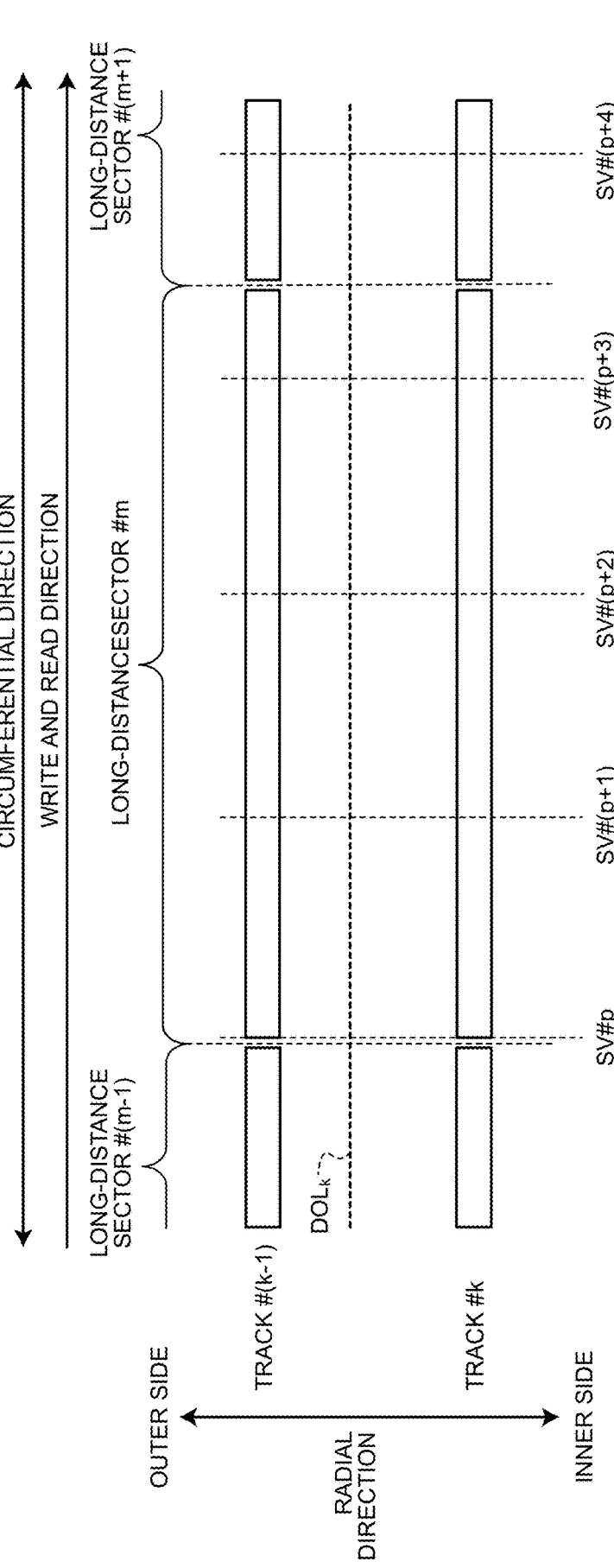
FIG. 17 is a diagram for explaining setting of a DOL at the time of writing to one track in a third modification.

FIG. 17 is a diagram for explaining setting of the DOL at the time of writing to a track #k in the third modification. As illustrated in the drawing, when writing to the track #k, the controller 30 sets the $DOL_k$ at a position offset by a predetermined distance from a set track center of the track #(k−1).

Figure 18:
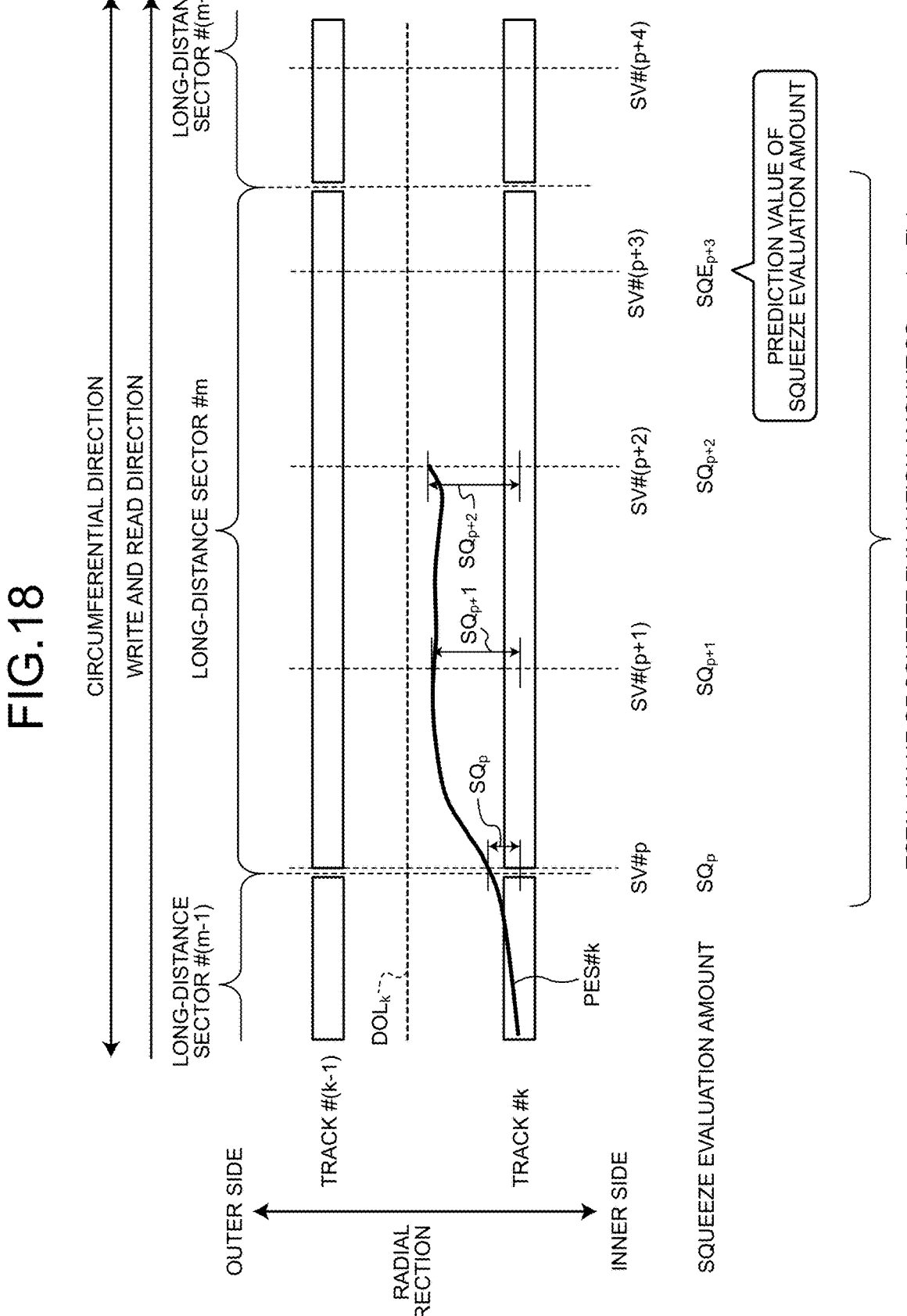
FIG. 18 is a diagram for explaining a write operation on a long-distance sector on one track in the third modification.

FIG. 18 is a diagram for explaining a write operation on a long-distance sector #m on the track #k in the third modification.

The controller 30 sequentially writes data from the head of the long-distance sector #m on the track #k. Every time the magnetic head 22 passes over the servo sector SV, the controller 30 calculates the total value SQsum1 of the squeeze evaluation amounts and compares the total value SQsum1 of the squeeze evaluation amounts with the threshold value Th1.

In the third modification, the controller 30 uses the squeeze amount as being the squeeze evaluation amount. The movement amount of the magnetic head 22 from the set track center of the track #k to the outer side corresponds to the squeeze amount. Therefore, the controller 30 acquires, as the squeeze evaluation amount, the movement amount of the magnetic head 22 from the set track center of the track #k to the outer side.

In the example illustrated in FIG. 18, writing has been executed up to a sector immediately preceding the servo sector SV #(p+2), and the magnetic head 22 has completed reading of servo information from the servo sector SV #(p+2). Therefore, the controller 30 acquires a squeeze evaluation amount $SQ_p$ in the servo sector SV #p, a squeeze evaluation amount $SQ_{p+1}$ in the servo sector SV #(p+1), and a squeeze evaluation amount $SQ_{p+2}$ in the servo sector SV #(p+2) on the basis of servo information read from each of the servo sectors SV. For the servo sector SV #(p+3) that has not passed yet, the controller 30 estimates the squeeze evaluation amount in a similar manner to that in the first embodiment.

After acquiring the squeeze evaluation amount $SQ_p$, the squeeze evaluation amount $SQ_{p+1}$, the squeeze evaluation amount $SQ_{p+2}$, and an estimated value $SQE_{p+3}$ of the squeeze evaluation amount in the servo sector SV #(p+3), the controller 30 calculates the total value SQsum1 of them. The controller 30 then compares the total value SQsum1 of the squeeze evaluation amounts with the threshold value Th1.

In a case where the total value SQsum1 of the squeeze evaluation amounts is less than the threshold value Th1, the controller 30 continues the write operation to the long-distance sector #m to write in.

In the example illustrated in FIG. 18, the total value SQsum1 of the squeeze evaluation amounts exceeds the threshold value Th1, whereby the controller 30 executes the protection operation.

Figure 19:
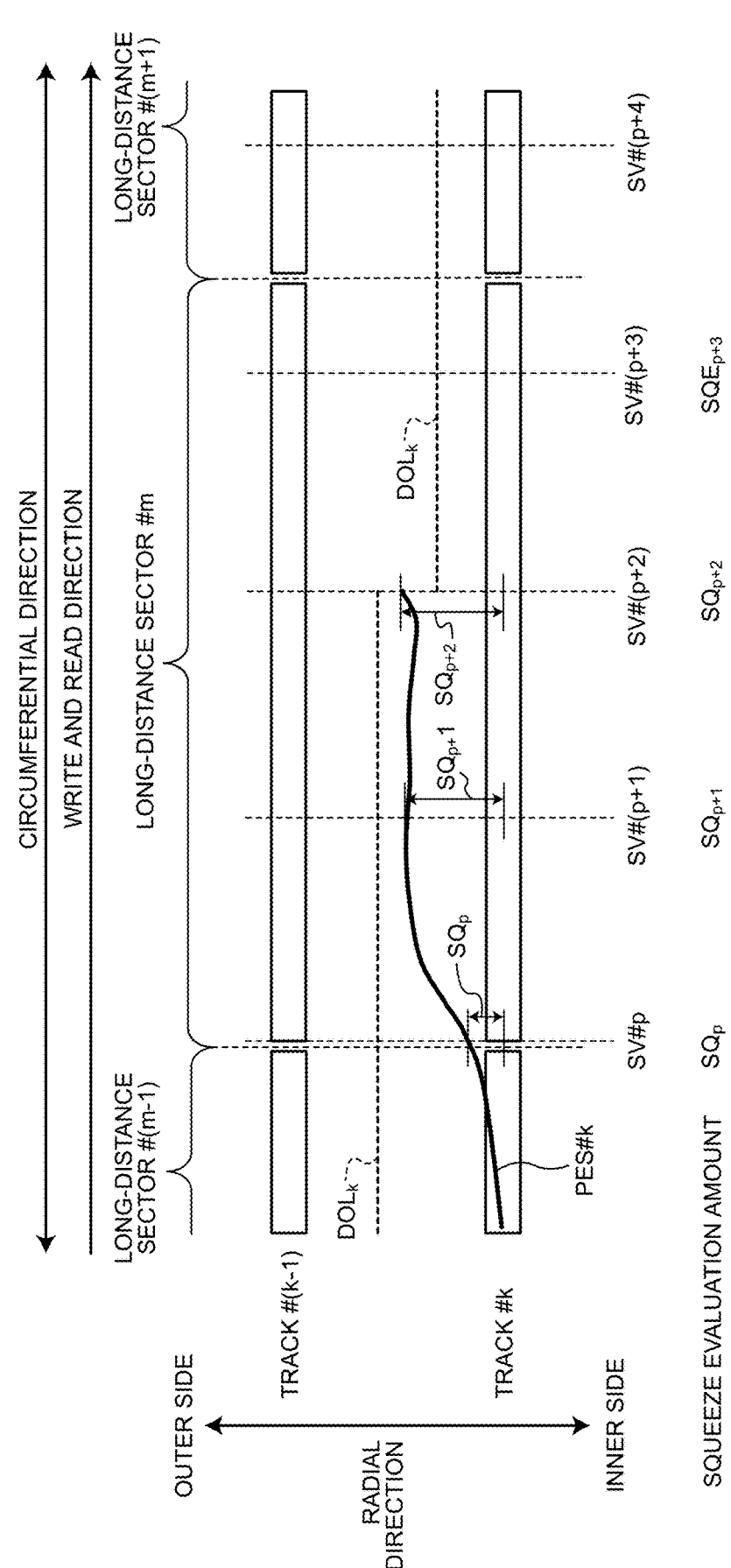
FIG. 19 is a diagram for explaining an example of a protection operation according to the third modification.

FIG. 19 is a diagram for explaining an example of the protection operation according to the third modification.

The controller 30 executes the protection operation in a case where the total value SQsum1 of the squeeze evaluation amounts exceeds the threshold value Th1 when the magnetic head 22 reaches the servo sector SV #(p+2). Specifically, the controller 30 tightens the $DOL_k$ behind the servo sector SV #(p+2).

Specifically, as illustrated in FIG. 19, the controller 30 moves the $DOL_k$ to the inner side behind the servo sector SV #(p+2). As a result, in the portion where the DOL; is tightened, the track width of the previous track is suppressed from being narrowed, and as a result, the data unit set written in the long-distance sector #m in the previous track is prevented from being difficult to read. That is, the data unit set written in the long-distance sector #m of the previous track is protected.

Second Embodiment

In description of a second embodiment, reference signs similar to those in the first embodiment are used for elements. The same matters as those of the first embodiment will be briefly described or omitted.

The error correction using the parity, namely, the second error correction is executed when the first error correction fails.

Specifically, a controller 30 reads a data unit to be read from a magnetic disk 11 and executes the first error correction on the data unit that has been read. In a case where the first error correction for the data unit to be read fails, the controller 30 reads data of one track 41 including the data unit to be read and the parity and executes error correction using the parity, namely, the second error correction on the data unit to be read.

In the second embodiment, similarly to the case of the first error correction, in order to estimate whether or not data free from errors can be acquired by the second error correction as accurately as possible, the controller 30 makes a determination on the basis of the total value of squeeze evaluation amounts obtained from not some of multiple servo sectors SV but all the multiple servo sectors SV included in the track 41, namely, the total value of squeeze evaluation amounts obtained for the whole track 41.

The total value of the squeeze evaluation amounts is compared with a threshold value (denoted as a threshold value Th2), and a protection operation is executed on the basis of a result of the comparison. As the protection operation, it is based on the premise that, also in the second embodiment, as an example, tightening of the DDOL is executed.

The capability of the second error correction depends on the number of sectors that cannot be corrected by the first error correction (referred to as error sectors) and on the degree of an error in the error sectors that exceeds the capability of the first error correction. For example, in a case where the number of error sectors is only two, correction can be performed even in a case where the squeeze evaluation amount is 10 nm. However, in a case where the number of error sectors is twenty, correction cannot be performed in some cases unless the squeeze evaluation amount is within 5 nm.

Considering the above, in the second embodiment, the controller 30 determines the threshold value Th2 on the basis of the number of error sectors. Since the total value of the squeeze evaluation amounts of each track 41 is larger than the total value of the squeeze evaluation amounts of each long-distance sector, the threshold value Th2 is larger than the threshold value Th1.

Figure 20:
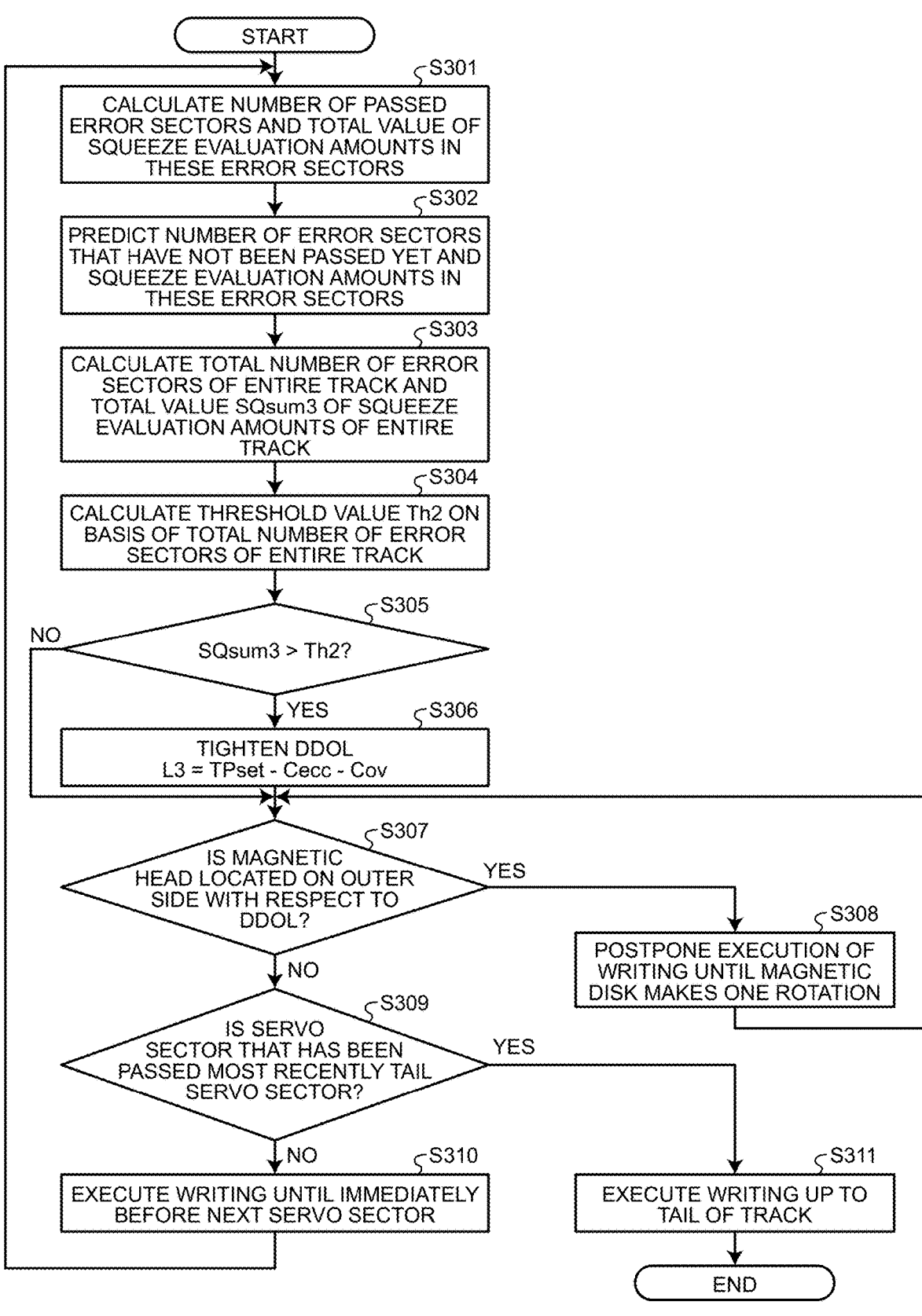
FIG. 20 is a diagram illustrating an example of a write operation on one track by a controller according to a second embodiment.

FIG. 20 is a diagram illustrating an example of the write operation on a track 41 to write in by the controller 30 according to the second embodiment.

In the write operation on the track 41 to write in, the controller 30 calculates the number of passed error sectors (that is, error sectors over which the magnetic head 22 has passed) and the total value of squeeze evaluation amounts in these error sectors (S301).

In one example, an error sector is a data sector included in a long-distance sector in which the total value SQsum1 of the squeeze evaluation amounts in a track 41 exceeds the threshold value Th1. The error sector may be a long-distance sector in which the total value SQsum1 of the squeeze evaluation amounts exceeds the threshold value Th1.

Subsequently, the controller 30 predicts the number of error sectors that have not been passed yet and their squeeze evaluation amounts (S302).

In the case of a long-distance sector, in the example of the drawing, each time the number of long-distance sectors for which the total value SQsum1 of squeeze evaluation amounts exceeds the threshold value Th1 is incremented by 1, the number of error sectors is incremented by 4. That is, as for error sectors in the write operation to a track 41 to be written in, both the number of error sectors having been passed and the number of error sectors that have not been passed yet may be incremented by 4. In a case where a parity sector is included, the number of error sectors may be incremented by 5.

The controller 30 calculates the total number of error sectors of the entire track 41 to write in and the total value of the squeeze evaluation amounts (denoted as SQsum3) of the entire track 41 to write in (S303). In addition, the controller 30 determines the threshold value Th2 on the basis of the total number of error sectors of the entire track 41 to write in (S304).

The controller 30 determines whether or not the total value SQsum3 of the squeeze evaluation amounts of the entire track 41 to write in is larger than the threshold value Th2 (S305).

If the total value SQsum3 is larger than the threshold value Th2 (S305: Yes), the controller 30 executes tightening of the DDOL as an example of the protection operation (S306). Specifically, controller 30 calculates a length L3 on the basis of the following Equation (3) and moves the DDOL to a position offset from a position error signal of the previous track to the inner side by the length L3.

$$L3 = TPset - Cecc + Cov \qquad (3)$$

Cecc denotes an index value of the error correction capability by the second error correction.

If the total value SQsum3 is not larger than the threshold value Th2 (S305: No), or after the processing of S306, the controller 30 determines whether or not the magnetic head 22 is positioned on the outer side (in other words, the previous track side) with respect to the DDOL (S307).

If the magnetic head 22 is positioned on the outer side with respect to the DDOL (S307: Yes), it is estimated that the magnetic head 22 is in the off-track state. Therefore, the controller 30 stops writing and postpones execution of writing until the magnetic disk 11 makes one rotation (S308). Then, when the magnetic disk 11 has made one rotation and the magnetic head 22 approaches again the position in the circumferential direction where the writing has stopped, the controller 30 executes the processing of S307 again.

If the magnetic head 22 is not positioned on the outer side with respect to the DDOL (S307: No), it can be estimated that the magnetic head 22 is in the on-track state. Therefore, the controller 30 executes writing. Specifically, first, the controller 30 determines whether or not a servo sector SV that has been passed most recently is the tail servo sector SV included in the track 41 to write in (S309).

If the servo sector SV that has been passed most recently is not the tail servo sector SV included in the track 41 to write in (S309: No), the controller 30 executes writing up to a sector immediately preceding the next servo sector SV (S310). Then, the control transitions to S301.

If the servo sector SV that has been passed most recently is the tail servo sector SV included in the track 41 to write in (S309: Yes), the controller 30 executes writing up to a tail of the track 41 to write in (S311). Then, the write operation ends.

Note that, in the series of operations illustrated in FIG. 20, the total value SQsum3 is an example of a third total value.

As described above, according to the second embodiment, the controller 30 calculates the total value SQsum3 of the squeeze evaluation amounts of the entire track 41 to write in. Moreover, in a case where the total value SQsum3 exceeds the threshold value Th2, the controller 30 executes the protection operation for protecting the data of the previous track 41.

Therefore, similarly to the above-described first embodiment, a decrease in the efficiency of the write operation due to frequent write retry operations is suppressed. That is, the magnetic disk apparatus 1 can write data efficiently.

Note that, similarly to the first embodiment, also in the second embodiment, a specific example of the protection operation is not limited to tightening of the DDOL.

In addition, according to the second embodiment, the controller 30 calculates the total number of error sectors of the entire track 41 to write in. Then, the controller 30 calculates the threshold value Th2 on the basis of the total number of error sectors of the entire track 41 to write in.

Therefore, the possibility that the second error correction fails can be suppressed.

Fourth Modification

In a case where tightening control of the DDOL using the threshold value Th1 is performed to ensure that a data unit set free from errors can be acquired from an adjacent long-distance sector by the first error correction, the frequency of write retry operations may increase due to off-track based on the tightened DDOL. That is, the write performance may be deteriorated.

On the other hand, in a case where the tightening control of the DDOL using the threshold value Th1 is not performed, the frequency of the execution of the second error correction due to a failure of the first error correction increases, thereby decreasing the read performance. Instead, a decrease in the write performance due to frequent write retry operations is suppressed.

Therefore, a controller 30 according to the fourth modification is configured to be capable of switching the control to be executed between the tightening control of the DDOL using the threshold value Th1 and the tightening control of the DDOL using the threshold value Th2. The controller 30 keeps balance between the degree of deterioration in the write performance and the degree of deterioration in the read performance by switching the two types of control for tightening the DDOL, thereby achieving both high write performance and high read performance.

Figure 21:
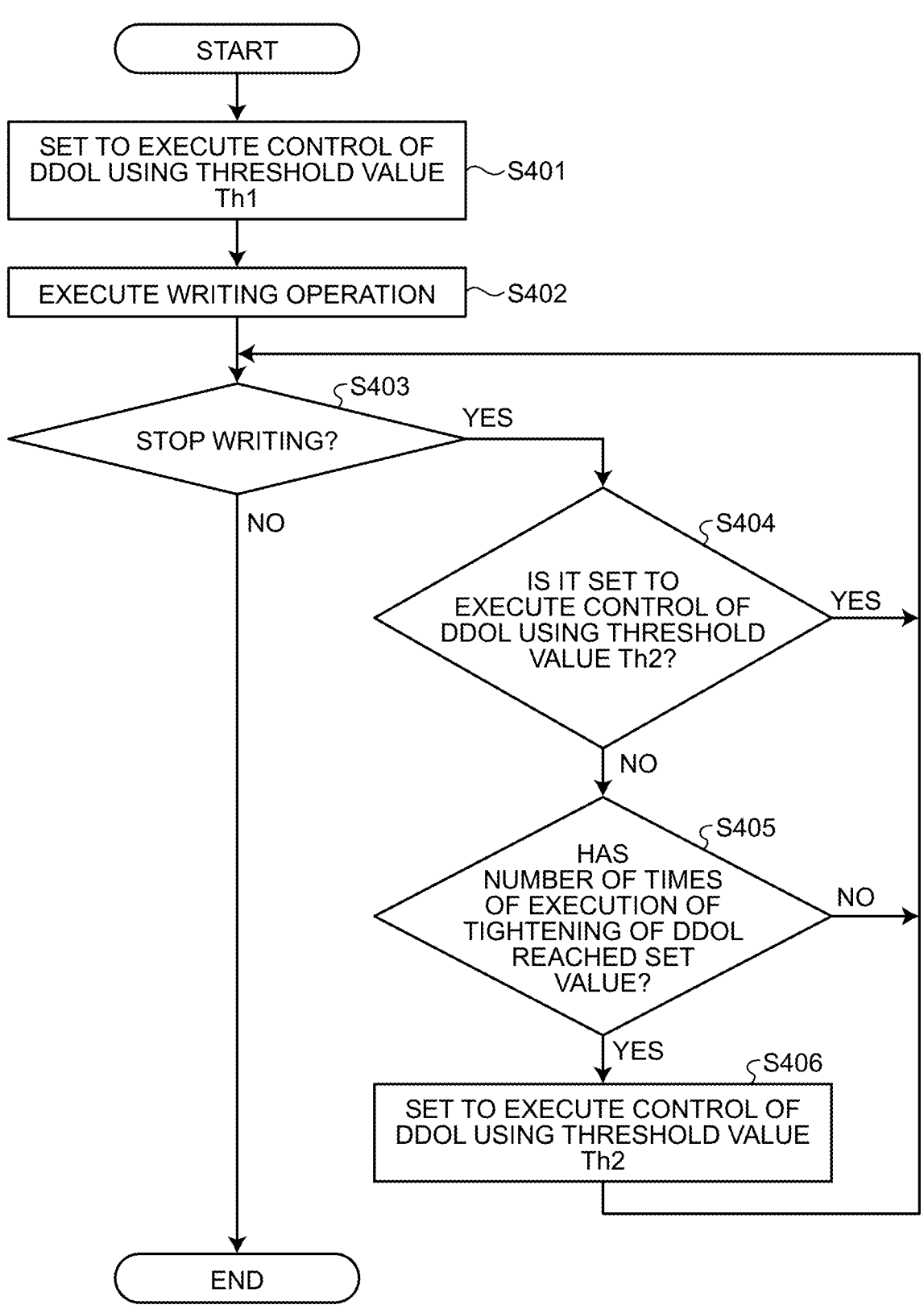
FIG. 21 is a flowchart for explaining an operation of switching the control of DDOL according to a fourth modification.

FIG. 21 is a flowchart for explaining an operation of switching the control of the DDOL according to the fourth modification. Illustrated in this drawing is an example of the operation of switching the control of the DDOL at the time of the write operation to one track 41. That is, the series of operations illustrated in the drawing is individually executed for each track 41.

In the initial setting, the controller 30 is set to execute the control of the DDOL using the threshold value Th1 (S401). That is, the controller 30 is set to perform tightening of the DDOL depending on the result of the comparison between the total value SQsum1 of the squeeze evaluation amounts in a long-distance sector and the threshold value Th1.

After executing the write operation (S402), the controller 30 determines whether or not a stop of writing due to off-track has occurred in the write operation (S403).

If the stop of writing has occurred (S403: Yes), the controller 30 determines whether or not it is currently set to execute control of the DDOL using the threshold value Th2 (S404).

If it is not currently set to execute control of the DDOL using the threshold value Th2 (S404: No), that is, if it is currently set to execute control of the DDOL using the threshold value Th1, the controller 30 determines whether or not the number of times of execution of tightening of the DDOL has reached a set value (S405).

If the number of times of execution of tightening of the DDOL has reached the set value (S405: Yes), the controller 30 changes the setting to execute the control of the DDOL using the threshold value Th1 (S406). That is, the controller 30 changes the setting such that the control for tightening the DDOL is stopped in response to the total value SQsum1 exceeding the threshold value Th1 and that the control for tightening the DDOL is executed in response to the total value SQsum3 exceeding the threshold value Th2.

If the stop of writing has not occurred (S403: No), the operation ends without the controller 30 switching the control of the DDOL.

If it is currently set to execute the control of the DDOL using the threshold value Th2 (S404: Yes), if the number of times of execution of tightening of the DDOL has not reached the set value (S405: No), or after S406, the control transitions to S403.

As described above, in a case where the number of times the total value SQsum1 exceeds the threshold value Th1 reaches the set value, the controller 30 stops the control to tighten the DDOL in response to the total value SQsum1 exceeding the threshold value Th1 and executes the control to tighten the DDOL in response to the total value SQsum3 exceeding the threshold value Th1.

Therefore, it is possible to achieve both high write performance and high read performance.

Fifth Modification

In the initial setting, the controller 30 is set to execute the control of the DDOL using the threshold value Th2. The controller 30 changes the setting to perform the tightening control of the DDOL in response to the total value SQsum1 exceeding the threshold value Th1 in a case where the number of error sectors having been passed exceeds a predetermined number in the write operation to the track 41 to write in.

Sixth Modification

In the above description, a configuration, in which data is written in a region longer than a length corresponding to the size of a unit that is transmitted to and received from the host, is referred to as a long-distance sector. The present disclosure is also applicable to a configuration in which the unit of the host has a length covering multiple servo sectors in the circumferential direction and data is written in the same size of unit. For example, the host 2 transmits data for every 16K sectors, and after interleaving, four data sectors DS constitute one long-distance sector.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
a magnetic disk on which multiple tracks are provided, the multiple tracks each including a long-distance sector;
a magnetic head that executes data writing and data reading to and from the multiple long-distance sector; and
a controller that executes an acquisition operation and a protection operation in a write operation to a first portion of a first track being one of the multiple tracks, the first portion being adjacent to a long-distance sector in a second track adjacent to the first track,
the acquisition operation being executed to acquire an evaluation amount corresponding to a squeeze amount of a track pitch in a range between two ends in the circumferential direction of the first portion,
the protection operation being executed to protect data of the second track on the basis of the evaluation amount.

2. The magnetic disk apparatus according to claim 1, wherein the controller executes the protection operation to protect the data of the second track on the basis of a first decision amount corresponding to the evaluation amount and a first threshold value.

3. The magnetic disk apparatus according to claim 2, wherein the controller executes the protection operation to protect the data of the second track in a case where the first decision amount exceeds the first threshold value.

4. The magnetic disk apparatus according to claim 1, wherein the track pitch is based on the track pitch in each of two or more first servo sectors, the two or more first servo sectors being two or more servo sectors included in the range between the two ends.

5. The magnetic disk apparatus according to claim 1, wherein the acquisition operation includes calculating the evaluation amount for a second servo sector over which the magnetic head has passed, the second servo sector being one of the two or more first servo sectors, the evaluation amount being calculated on the basis of at least a position error signal of the first track.

6. The magnetic disk apparatus according to claim 5, wherein the acquisition operation further includes predicting the evaluation amount for a third servo sector over which the magnetic head has not yet passed, the third servo sector being one of the two or more first servo sectors.

7. The magnetic disk apparatus according to claim 1, wherein, in the protection operation, the controller stops the write operation in a case where the first decision value exceeds the first threshold value.

8. The magnetic disk apparatus according to claim 1, wherein
the second track includes a parity sector in which parity for error correction to be performed on the second track is stored, and
the controller further executes
the acquisition operation and comparison between a first decision value corresponding to the evaluation amount and the first threshold value for a long-distance sector included in the second track,
calculation of a second decision corresponding to the entire second track, and
a protection operation for protecting data of the second track in a case where the second decision value exceeds a second threshold value.

9. The magnetic disk apparatus according to claim 8, wherein the controller further executes
calculation of a total number of error sectors in the entire second track; and
determination of the second threshold value on the basis of the total number.

10. The magnetic disk apparatus according to claim 8, wherein the controller calculates the total number of error sectors of the entire second track by incrementing a count number of error sectors by a number of data sectors included in a long-distance sector.

* * * * *